United States Patent [19]

Alsamarraie et al.

[11] Patent Number: 5,079,293

[45] Date of Patent: Jan. 7, 1992

[54] THERMOPLASTIC COMPOSITIONS CONTAINING COMBINED MODIFIERS

[75] Inventors: Muhanad A. Alsamarraie, Parkersburgh; Stanley Y. Hobbs, Schenectady, N.Y.; I-Chung W. Wang, Vienna, W. Va.; James L. DeRudder, Mt. Vernon, Ind.; Vicki H. Watkins; Marinus E. J. Dekkers, both of Schenectady, N.Y.

[73] Assignee: General Electric Company, Parkersburg, W. Va.

[21] Appl. No.: 356,356

[22] Filed: May 24, 1989

Related U.S. Application Data

[63] Continuation-in-part of Ser. No. 271,246, Nov. 14, 1988.

[51] Int. Cl.$^5$ ............................................... C08L 79/08
[52] U.S. Cl. ........................................ 525/66; 525/63; 525/67; 525/68; 525/100; 525/105; 525/106; 525/421; 525/422; 525/439; 525/440; 525/445; 525/464; 525/479; 525/393; 525/702
[58] Field of Search .................... 525/63, 67, 66, 100, 525/105, 104, 421, 422, 439, 445, 440, 464, 477, 702, 393, 68

[56] References Cited

U.S. PATENT DOCUMENTS

| | | | |
|---|---|---|---|
| 2,465,319 | 3/1949 | Whinfield | 260/75 |
| 2,891,920 | 6/1959 | Hyde et al. | 260/29.2 |
| 2,901,466 | 8/1959 | Kibler et al. | 260/75 |
| 3,047,539 | 7/1962 | Pengilly | 260/75 |
| 3,220,972 | 11/1965 | Lamoreaux | 260/46.5 |
| 3,271,367 | 9/1966 | Schnell et al. | 260/49 |
| 3,737,409 | 6/1973 | Fox | 260/49 |
| 3,775,452 | 11/1973 | Karstedt | 260/429 |
| 3,898,300 | 8/1975 | Hilliard | 260/827 |
| 4,071,577 | 1/1978 | Falender et al. | 260/827 |
| 4,226,761 | 10/1980 | Cooper et al. | 525/63 |
| 4,556,705 | 12/1985 | McCready | 528/289 |
| 4,564,653 | 1/1986 | Kamata et al. | 525/67 |
| 4,812,515 | 3/1989 | Kress et al. | 525/69 |

FOREIGN PATENT DOCUMENTS

| | | |
|---|---|---|
| 0166900 | 1/1986 | European Pat. Off. |
| 236596 | 9/1987 | European Pat. Off. |
| 0249964 | 12/1987 | European Pat. Off. |
| 0260552 | 3/1988 | European Pat. Off. |
| 3521956 | 1/1987 | Fed. Rep. of Germany |
| 8600166 | 8/1987 | Netherlands |
| 1590549 | 6/1981 | United Kingdom |

OTHER PUBLICATIONS

D. Graiver et al., Rubber Chem. Tech., 56(5), 918(1983).
S. Y. Hobbs et al., Polymer Bulletin, 17, 341 (1987).
S. Y. Hobbs et al., Journal of Material Science, 23, 1219 (1988).

*Primary Examiner*—Melvyn I. Marquis
*Assistant Examiner*—R. Dean, Jr.
*Attorney, Agent, or Firm*—Hedman, Gibson, Costigan & Hoare

[57] ABSTRACT

Polyphasic resin blends and particularly polycarbonate/polyester blends, are prepared with modifiers comprising combinations of polyorganosiloxane/-polyvinyl-based graft copolymer(s), polyorganosiloxane-based graft copolymer(s) and/or diene rubber-based graft copolymer(s), imparting a wide range of physical properties to the blends.

129 Claims, 7 Drawing Sheets

0.5μm

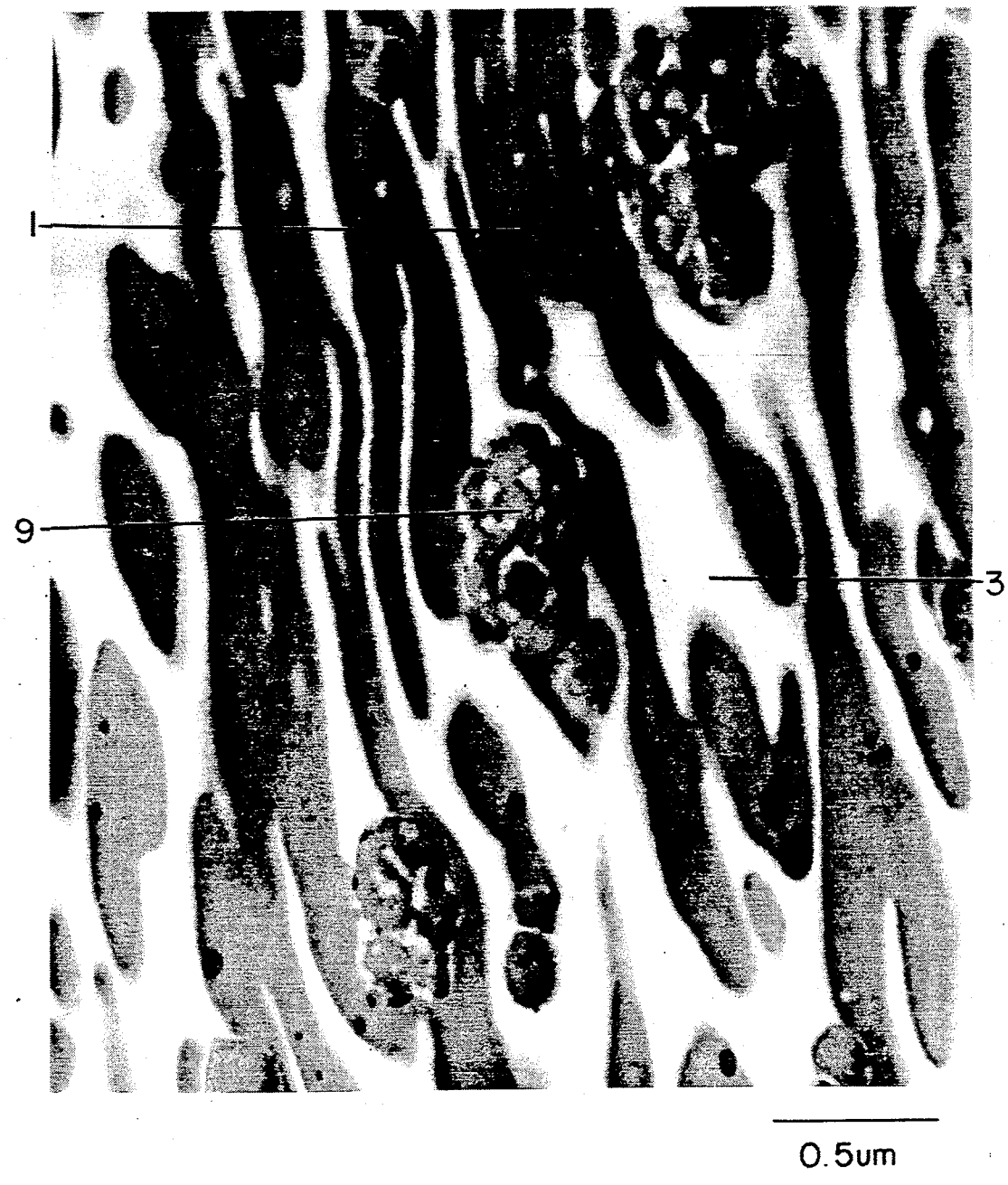
F I G. 4

THERMOPLASTIC COMPOSITIONS CONTAINING COMBINED MODIFIERS

This application is a continuation-in-part of copending application Ser. No. 271,246, filed on Nov. 14, 1988.

CROSS REFERENCE TO RELATED APPLICATIONS

This application is related to the following commonly owned U.S. patent applications all filed on Nov. 14, 1988:

| Ser. No. | | SUBJECT MATTER | APPLICANT(S) |
| --- | --- | --- | --- |
| 271,250 | pending | Polyorganosiloxane/ polyvinyl-based Graft Polymers, Process and Thermoplastic Compositions Containing the Same | I-C. W. Wang |
| 271,223 | U.S. Pat. No. 4,939,205 | Thermoplastic Molding Compositions Containing Polyorganosiloxane/polyvinyl-based Graft Polymer Modifiers | J. L. DeRudder F. J. Traver I-C. W. Wang |
| 271,222 | Now U.S. Pat. No. 4,927,880 | Low Gloss Molded Articles Using Polyorganosiloxane/ polyvinyl-based Graft Polymers | J. L. DeRudder H. Savenije I-C. W. Wang |
| 271,249 | pending | Polyphenylene ether or Polyphenylene ether/Polystyrene with Polyorganosiloxane/polyvinyl-based Graft Polymer Modifiers | M. A. Alsamarraie W. R. Haaf W. J. Peascoe I-C. W. Wang |
| 271,248 | pending | Polyorganosiloxane/ polyvinyl-based Graft (meth)acrylate Polymers | M. A. Alsamarraie S. Y. Hobbs I-C. W. Wang V. H. Watkins |
| 271,247 | pending | Polyester, Polycarbonate and/or Polyphenylene Ether with Polyorganosiloxane/ polyvinyl-based Graft (meth)-acrylate Polymers | M. A. Alsamarraie S. Y. Hobbs I-C. W. Wang V. H. Watkins |
| 271,230 | Now U.S. Pat. No. 4,939,206 | Flame Retardant Polyorganosiloxane-based Graft Polymers | I-C. W. Wang |
| 271,246 | pending | Polycarbonate and Polyester Blends Modified with Polyorganosiloxane Graft Polymers Combined with Diene Rubber-based Graft Polymers | J. L. DeRudder I-C. W. Wang |
| 271,896 | Now U.S. Pat. No. 4,968,746 | Polyesters Modified with Polyorganosiloxane/polyvinyl-based Graft Polymers | J. L. DeRudder I-C. W. Wang |

FIELD OF THE INVENTION

This invention relates to thermoplastic resins comprising a polycarbonate resin alone or polyphasic resin mixtures of polycarbonate resin with a saturated polyester resin and/or an elastomer, comprising a poly(etherester) elastomer or a poly(etherimide ester) elastomer or both and/or a polyphenylene ether resin, and a modifier composition comprising two multi-stage graft polymer compositions in combination.

BACKGROUND OF THE INVENTION

Polycarbonate resin compositions and blends with other thermoplastic resins are widely used because of their excellent properties.

There have been many attempts in the art to provide polyorganosiloxane-based graft polymers which may be useful as impact strength modifiers for thermoplastic resins. See, for example, U.S. Pat. No. 2,891,920 (J. F. Hyde, et al.); and O. Graiver, et al., Rubber Chem. Tech., 56 (5), 918 (1983).

U.S. Pat. No. 3,898,300 states that a polyorganosiloxane-based graft copolymer for improving the impact strength of styrene (S)/acrylonitrile (AN) resin is formed by grafting S/AN comonomers in an emulsion system onto the vinylsiloxane or allylsiloxane containing silicone substrate. U.S. Pat. No. 4,071,577 describes a similar approach by using a mercaptosiloxane in place of vinyl-group containing siloxanes. European Patent Application No. 0,166,900 reports further improvement of polysiloxane-based graft polymers and increased S/AN impact strength by using acryloxy-functionalized siloxane as the graft-linking agent.

Relevant for its broad teachings is BASF's U.K. Patent No. 1,590,549 which describes the use of a polyorganosiloxane-based graft copolymer in various thermoplastic compositions. Poor compatibility is observed with these compositions. Similarly, European Patent Application No. 249,364 describes the use of a polyorganosiloxane-based graft copolymer in polycarbonate resin compositions and mixtures thereof with a saturated polyester and/or a polyester elastomer. The modifier therein has relatively poor rubber integrity and incompatibility with the resins as well.

The use of a diene or acrylic rubber-based modifier in thermoplastic resins has become a common practice in the art. The selection of either material depends largely on the end use purposes such as weatherability or low temperature impact resistance. Uniform color appearance of molded parts is a benefit which is gained by using a diene-based modifier over acrylics. However, the unsaturated moieties of the diene rubber restrict its outdoor use to some extent due to its tendency to oxidize and to yellow.

None of the references disclose the in-situ co-homopolymerization of vinyl monomers in the presence of siloxanes in an emulsion system, as described hereinbelow. The present invention is also directed to the use of graft polymers provided by subsequent graft polymerization of vinyl monomers (e.g. polymethyl (meth)acrylate, polystyrene or styrene/acrylonitrile copolymer) in the presence of such a co-homopolymerized polyorganosiloxane/vinyl-based substrate.

Surprisingly, it has been found that partial replacement of the oxidation or ozone sensitive rubber by a silicone-based rubber affects more improvements, such as low temperature ductility, low gloss, and impact and discoloring resistance against thermal aging on the blends described hereinafter. Unexpectedly, it is now possible to prepare low gloss polycarbonate and polyester blends having both excellent low temperature resistance and discoloration resistance by the addition of an effective amount of a silicone-based impact modifier to a diene-based modifier.

Mention is also made to European Patent Application No. 0,260,558 which discloses a combination of a silicone-based modifier with an alkylacrylate-based modifier. The patentee, however, makes no mention of the use of a diene-based impact modifier.

Additionally, it is described in S. Y. Hobbs et al, Polymer Bulletin, 17, 341 (1987) and S. Y. Hobbs et al, Journal of Material Science, 23, 1219 (1988) that in polycarbonate/saturated polyester resin blends, typical core-shell type modifiers such as Acryloid ® KM-330 (polybutylacrylate core-methyl methacrylate shell, Rohm and Haas Company) or KM-653 (polybutadiene core-styrene/methyl methacrylate polymer shell, Rohm and Haas Company) segregate completely in the polycarbonate phase leaving the less ductile saturated polyester phase without any modifier.

There is evidence that in blends or mixtures comprised of two different resins, modification of both phases can significantly improve low temperature toughness. Van der Meer, in Dutch Patent Application No. 8600166 filed on Jan. 12, 1986 and in European Patent Application No. 0.236,596, published on Sept. 16, 1987, and Van der Meer and Hobbs in commonly owned copending U.S. Patent Application Serial No. 07/007,268 filed on Jan. 27, 1987, attorney's docket no. 335-2019 (8CB-10,306) have demonstrated this in polyphenylene ether (PPE)/polyamide (nylon) blends where Kraton ® rubber (styrene-butadiene-styrene ABA block copolymer, Shell Chemical Company) was used to modify the PPE phase and maleic anhydride functionalized EPDM (ethylene-propylene-nonconjugated diene monomer polymer) rubber was used to modify the nylon phase.

BASF's German Patent No. 3521956 discloses the modification of the poly(butylene terephthalate) (PBT) phase of a PBT/PC polyphasic blend through the incorporation of olefin polymers that contain epoxy groups. The effectiveness of this method, however, depends on the ability to establish sufficient grafting of PBT on the epoxy groups of the olefin polymers during compounding in an extruder. The fact that both mixing and grafting chemistry must take place simultaneously places high demands on the compounding process, and therefore, the success of the BASF method has been limited.

It has been surprisingly found that migration of multistage graft polymer modifiers can be induced to segregate different modifiers into the different phases of polyphasic PC/PBT containing blends or mixtures of the same with poly(etherester) elastomer, poly(etherimide ester) elastomer and/or polyphenylene ether resins by varying the amount of (meth)acrylonitrile in the outermost stage of the modifiers. Therefore, two or more different modifiers, each with a different amount of (meth)acrylonitrile in the outermost stage can be combined to yield a desired distribution of modifier in the PC phase and in the PBT phase resulting in optimum toughness of the polyphasic blend. Such blends particularly exhibit superior low temperature toughness when compared with those formulated with modifiers residing in only one phase of the blend.

BRIEF DESCRIPTION OF THE DRAWINGS

FIG. 4 is a transmission electron micrograph of a polyphasic blend of PC, PBT, and CSiM modifier ((Si/PS)-MMA/AN wt. ratio of 70:30, Si/PS wt. ratio of 95:5, MMA/AN wt. ratio of 75:25), stained with OsO$_4$ and RuO$_4$, showing complete segregation of the modifier in the PBT phase.

SUMMARY OF THE INVENTION

Figure 1:
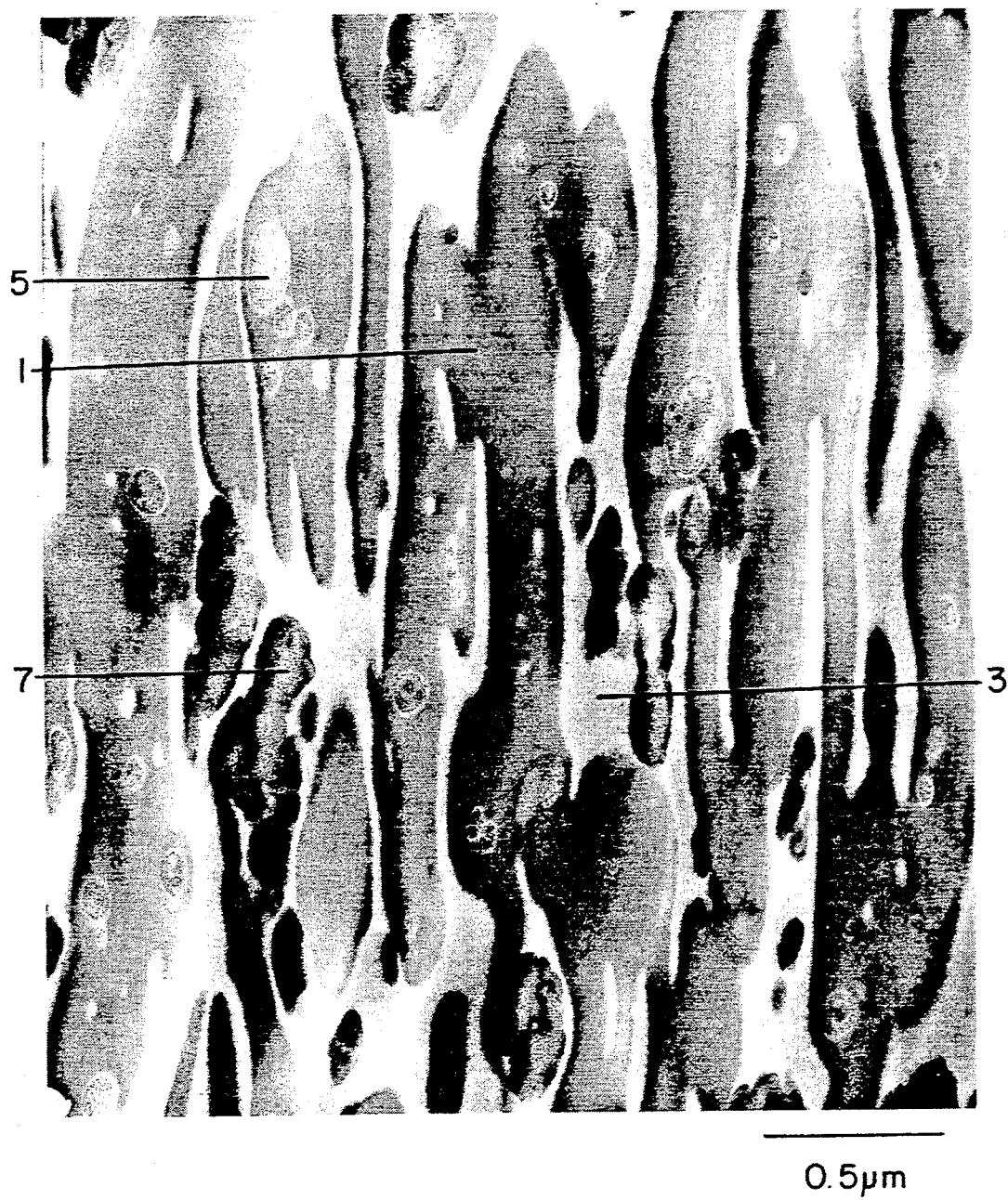
FIG. 1 is a transmission electron micrograph of a polyphasic blend of PC, PBT, a polyorganosiloxane-/polyvinyl-based graft copolymer modifier (CSiM) (Silicone (Si)/Polystyrene (PS)-Methyl methacrylate (MMA) wt. ratio of 70:30, Si/PS wt. ratio of 95:5) and a CSiM modifier ((Si/PS)-S/AN wt. ratio of 70:30, Si/PS wt. ratio of 95:5, S/AN wt. ratio of 75:25, stained with OsO$_4$ and RuO$_4$, showing the complete segregation of CSiM modifier ((Si/PS)-MMA) in the PC phase and CSiM modifier ((Si/PS)-S/AN, S/AN wt. ratio of 75:25) in the PBT phase.

According to the present invention, there are provided polyphasic resin compositions comprising a mixture (A-1) comprising (i) a polycarbonate resin phase and (ii) a saturated polyester resin phase; a mixture (A-2) comprising (i) a polycarbonate resin phase, (ii) a saturated polyester resin phase, (iii) a poly(etherimide) elastomer phase; (iv) a poly(etherimide ester) elastomer phase, (v) a polyphenylene ether resin phase, or a mixture of (i), (ii) and any of (iii), (iv) and (v); or a mixture (A-3) of (A-1) and (A-2); and an effective amount of a modifier composition (B) comprising, in combination, (1) a multi-stage graft polymer composition comprising
  (a) as a first stage,
    (i) an organosiloxane polymer, units derived from a cross-linking agent or agents and optionally units which serve as a graft-linking agent or agents;
    (ii) a polymeric substrate comprised of units of a diene rubber and optionally units derived from a cross-linking agent or agents; or
    (iii) a polymeric co-homopolymerized substrate comprising of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and
  (b) at least one subsequent stage or stages graft polymerized in the presence of any previous stages and which is comprised of a vinyl-based polymer or a cross-linked vinyl-based polymer, the outermost stage of which contains from zero to no more than an amount of polymerized or copolymerized (meth)acrylonitrile units which will induce migration of multi-stage composition (1) into said polycarbonate resin phase; and (2) a multi-stage graft polymer composition comprising
  (a) as a first stage,
    (i) an organosiloxane polymer, units derived from a cross-linking agent or agents and optionally units which serve as a graft-linking agent or agents;
    (ii) a polymeric substrate comprised of units of a diene rubber and optionally units derived from a cross-linking agent or agents; or
    (iii) a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and
  (b) at least one subsequent stage or stages graft polymerized in the presence of any previous stages and which is comprised of a vinyl-based polymer or a cross-linked vinyl-based polymer, the outermost stage having a content of a polymerized or copolymerized (meth)acrylonitrile units at least sufficient to induce migration of multi-stage composition (2) into said saturated polyester resin phase.

Also contemplated by the invention is a composition as defined above, but where the modifier composition (B) additionally comprises a third component (3) which is different than both (1) and (2) and which comprises.
  (a) as a first stage
    (i) an organosiloxane polymer, units derived from a cross-linking agent or agents and optionally units which serve as a graft-linking agent or agents;
    (ii) a polymeric substrate comprised of units of a diene rubber and optionally units derived from a cross-linking agent or agents; or
    (iii) a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and
  (b) at least one subsequent stage or stages graft polymerized in the presence of any previous stages and which is comprised of a vinyl-based polymer or a cross-linked vinyl-based polymer.

Further contemplated by the invention are compositions as above defined wherein subsequent stages (1)(b) comprise (b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and (b)(ii) a third stage comprising at least one vinyl-based polymer or cross-linked vinyl-based polymer which is the same or different than (b)(i) and which contains from zero to no more than an amount of polymerized or copolymerized (meth)acrylonitrile which will induce migration of the multi-stage composition (1) into the polycarbonate resin phase.

Additionally, compositions wherein subsequent stages (2)(b) comprise (b)(i) a second stage comprising at least one vinyl-polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and (b)(ii) a third stage comprising at least one vinyl-based polymer which is the same as or different than (b)(i), and which has a content of polymerized or copolymerized (meth)acrylonitrile units at least sufficient to induce migration of multi-stage composition (2) into the saturated polyester resin phase; and compositions wherein both subsequent stages (1)(b) and (2)(b) comprise two stages, (1)(b)(i) and (1)(b)(ii), and (2)(b)(i) and (2)(b)(ii) correspondingly, as described immediately above are proposed.

Another preferred embodiment of the present invention encompasses a polyphasic resin composition comprising a mixture (A-1) comprising (i) a polycarbonate resin phase and (ii) a saturated polyester resin phase; and an effective amount of a modifier composition (B) comprising, in combination, (1) a multi-stage polyorganosiloxane/polyvinyl-based graft polymer composition comprising (a) as a first stage, a polymeric co-homopolymerized substrate comprised of, in combination, an organosiloxane polymer; at least one vinyl-based polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and (b) at least one subsequent stage or stages graft polymerized in the presence of any previous stages and which is comprised of a vinyl-based polymer or a cross-linked vinyl-based polymer, the outermost stage of which contains from zero to more than an amount of polymerized or copolymerized (meth)acrylonitrile units which will induce migration of multi-stage composition (1) into the polycarbonate resin phase; and (2) a multi-stage polyorganosiloxane/polyvinyl-based graft polymer composition comprising (a) as a first stage, a polymeric co-homopolymerized substrate, which may be the same as or different than (1)(a), comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve a graft-linking agent or agents, or a mixture of any of the foregoing; and (b) at least one subsequent stage or stages graft polymerized in the presence of any previous stages and which is comprised of a vinyl-based polymer or a cross-linked vinyl-based polymer, the outermost stage having a content of polymerized or copolymerized (meth)acrylonitrile units at least sufficient to induce migration of multi-stage composition (2) into the saturated polyester resin phase.

A preferred feature of the embodiment contemplates subsequent stage (1)(b) comprising (b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and (b)(ii) a third stage comprising at least one vinyl-based polymer or crosslinked vinyl-based polymer which is the same as or different than (b)(i) and which contains from zero to no more than an amount of polymerized or copolymerized (meth)acrylonitrile units which will induce migration of multi-stage composition (1) into the polycarbonate resin phase.

Subsequent stage (2)(b) comprising (b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and (b)(ii) a third stage comprising at least one vinyl-based polymer or a cross-linked vinyl-based polymer which is the same as or different than (b)(i) and which has a content of polymerized or copolymerized (meth)acrylonitrile units at least sufficient to induce migration of multi-stage composition (2) into the saturated polyester resin phase is also contemplated as are compositions wherein both (1)(b) and (2)(b) comprise two stages, (1)(b)(i) and (1)(b)(ii), and (2)(b)(i) and (2)(b)(ii), correspondingly, as described immediately above.

The invention also provides a process for producing a polyphasic resin composition comprising the steps of:

(i) providing two first stage substrates independently by the concurrent co-homopolymerization of an organosiloxane, one or more vinyl-based monomers, and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing;

(ii) independently neutralizing each of the two reaction masses of the foregoing polymerization step to a pH of at least about 6.5 to provide a neutralized polyorganosiloxane/polyvinyl-based substrate latex;

(iii) graft polymerizing to one of the first stage substrates at least one vinyl-based monomer or a vinyl-based monomer and a cross-linker, said monomers being selected to provide that the outermost stage contains from zero to no more than an amount of polymerized or copolymerized (meth)acrylonitrile which will induce migration of the resultant multi-stage composition into the polycarbonate resin phase of a polycarbonate resin phase/saturated polyester resin phase mixture;

(iv) graft polymerizing to the remaining first stage substrate a vinyl-based monomer or a vinyl-based monomer and a cross-linker, said monomers being selected to provide that the outermost stage has a content of polymerized or copolymerized (meth)acrylonitrile units at least sufficient to induce migration of the resultant multistage composition into the saturated polyester resin phase of a polycarbonate resin phase/saturated polyester resin phase mixture;

(v) isolating the two multi-stage organosiloxane/vinyl-based graft polymers to provide polyorganosiloxane/polyvinyl-based modifiers for thermoplastic resins;

(vi) combining independent modifying amounts of the two polyorganosiloxane/polyvinyl-based modifiers with a polyphasic resin mixture.

Processes also are defined wherein in step (i) only one first stage substrate is provided and that substrate is subsequently divided into two poritions; wherein graft polymerization step (iii) is carried out in two successive stages comprising (1) graft polymerizing at least one vinyl-based monomer; or vinyl-based monomer in admixture with a cross-linker, a graft-linker, or a cross- and graft-linker or a mixture of any of the foregoing to produce a second stage polymer or cross-linked polymer on the substrate; and thereafter, (2) graft polymerizing at least one vinyl-based monomer, or a vinyl-based monomer and a cross-linker, which is the same as or different than that used in stage (1) to produce a third stage of polymer on the second stage, said monomers being selected to provide that the outermost stage contains from zero to no more than an amount of polymerized or copolymerized (meth)acrylonitrile units which will induce migration of the resultant multi-stage composition into the polycarbonate resin phase of a polycarbonate resin phase/saturated polyester resin phase mixture;

wherein step (iv) is carried out in two successive stages comprising: (1) graft polymerizing at least one vinyl-based monomer; or vinyl-based monomer in admixture with a cross-linker, a graft-linker or a cross- and graft-linker or a mixture of any of the foregoing to produce a second stage polymer or cross-linked polymer on said substrate; and thereafter, (2) graft polymerizing at least one vinyl-based monomer or a vinyl-based monomer and a cross-linker which is the same or different than that used in stage (1) to produce a third stage polymer on the second stage, said monomer being selected to provide that the outermost stage has a content of polymerized or copolymerized (meth)acrylonitrile units at least sufficient to induce migration of the resultant multi-stage composition into the saturated polyester resin phase of a polycarbonate resin phase/saturated polyester resin phase mixture; and wherein both steps (iii) and (iv) are carried out in two stages as described immediately above.

Also contemplated in another aspect of the invention are compositions comprising a polycarbonate resin (A); a mixture (A-1) comprising (i) a polycarbonate resin and (ii) a saturated polyester resin; a mixture (A-2) comprising (i) a polycarbonate resin, and (iii) a poly(etherester) elastomer or (iv) a poly(etherimide ester) elastomer or a mixture of (iii) and (iv); a mixture (A-3) comprising (i) a polycarbonate resin, (ii) a saturated polyester resin and (iii) a poly(etherester) elastomer, (iv) a poly(etherimide) elastomer or a mixture of (iii) and (iv); or a mixture (A-4) of any of the foregoing; and an effective amount of a modifier composition (B) comprising, in combination, (1) a multi-stage polyorganosiloxane-based graft polymer composition (GSim) comprising (a) as a first stage, an organosiloxane polymer, units derived from a cross-linking agent or agents and optionally units which serve as a graft-linking agent or agents; and (b) at least one subsequent stage or stages graft polymerized in the presence of any previous stages and which is comprised of a vinyl-based polymer or a cross-linked vinyl-based polymer; and (2) a diene rubber-based graft copolymer composition comprising (a) as a first stage, a polymer substrate comprised of units of a diene rubber and optionally units derived from a cross-linking agent or agents; and (b) at least one subsequent stage graft polymerized in the presence of any previous stages and which is comprised of a vinyl-based polymer or a cross-linked vinyl-based polymer, the weight ratio of (1) to (2) being from 1 to 9:9 to 1.

Also contemplated in the preferred feature is a composition wherein first stage (1)(a) is replaced by first stage (1)(a) which comprises a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing.

Additionally, envisioned in this preferred feature are subsequent stages in components (1) and (2) comprising:

(b)(i) a second stage comprising at least one vinyl polymer and optionally units derived from a cross-linking agent or agents, units which serve as a graft-linking agent or agents, units derived from a cross-linking agent or agents and units from the same agent or agents which serve as a graft-linking agent or agents, or a mixture of any of the foregoing; and (b)(ii) a third stage comprising at least one vinyl-based polymer or a cross-linked vinyl-based polymer which is the same or different than (b)(i).

DETAILED DESCRIPTION OF THE INVENTION

Polycarbonate resins (A) or (i), suitable for use in this invention, can comprise non-aromatic as well as aromatic forms. With respect to aromatic polycarbonate resins, these can be made by those skilled in this art or can be obtained from a variety of commercial sources. They may be prepared by reacting a dihydroxy compound such as a dihydric phenol and/or a polyhydroxy compound with a carbonate precursor, such as phosgene, a haloformate or a carbonate ester such as a diester of carbonic acid. Typically, they will have recurring structural units of the formula:

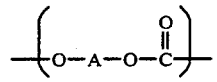

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis-(4-hydroxyphenyl)propane; 2,2-bis-(3,5-dimethyl-4-hydroxyphenyl)propane; 4,4'-di-hydroxydiphenyl ether; bis(2-hydroxyphenyl)methane, mixtures thereof and the like. The preferred aromatic carbonate polymer for component (A) or (i) is a homopolymer derived from 2,2-bis(4-hydroxyphenyl)propane(bisphenol-A).

Poly(ester carbonates) for use in the invention are known and can be obtained commercially. Generally, they are copolyesters comprising recurring carbonate groups:

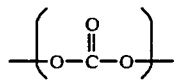

carboxylate groups

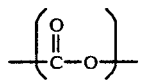

and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid such as phthalic acid, isophthalic acid, terephthalic acid, homophthalic acid, o-, m-, and p-phenylenediacetic acid; the polynuclear aromatic acids, such as diphenic acid, 1,4-naphthalic acid; mixtures of any of the foregoing, and the like, with a dihydric phenol and a carbonate precursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units to benzenedicarboxylate units to carbonate units can range from 1:0.30–0.80:0.70–0.20 and the molar range of terephthalate units to isophthalate units can range from 9:1 to 2:8 in this preferred family of resins.

The aromatic dihydric phenol sulfone polymer resins useful in components (A) and (i) are a family of resins which can be made by those skilled in this art. For example, homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polymerizing bis-(3,5-dimethyl-4-hydroxyphenyl)sulfone, alone, or especially in combination with bisphenol-A with phosgene or a phosgene precursor, in accordance with the description in Fox, U.S. Pat. No. 3,737,409. Especially preferred is a copolymer made by reacting 40 to 99 weight percent of the sulfone, 1 to 60 weight percent of the bisphenol with phosgene.

Polyesters (ii) suitable for use herein may be saturated or unsaturated or polyester elastomers and are generally derived from an aliphatic or cycloaliphatic diol, or mixtures thereof, containing from 2 to about 10 carbon atoms and at least one aromatic dicarboxylic acid. Preferred saturated polyester resins comprise the reaction product of a dicarboxylic acid or a chemical derived from an aliphatic diol and an aromatic dicarboxylic acid and have repeated units of the following general formula:

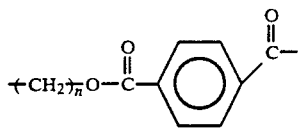

wherein n is an integer of from 2 to 4.

The most preferred polyesters are poly(ethylene terephthalate) and poly(1,4-butylene terephthalate).

Also contemplated herein are the above polyesters with minor amounts, e.g., from 0.5 to about 2 percent by weight, or units derived from aliphatic acid and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixture thereof) of, for example, 1,4-cyclohexanedimethanol with an aromatic dicarboxylic acid as to produce a polyester having recurring units of the following formula:

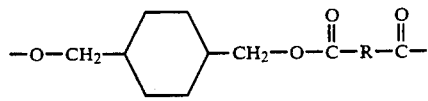

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

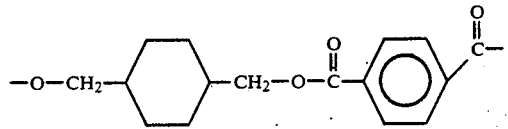

Still another preferred polyester is a copoly-ester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

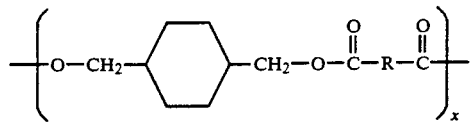

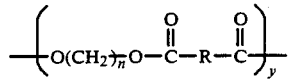

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

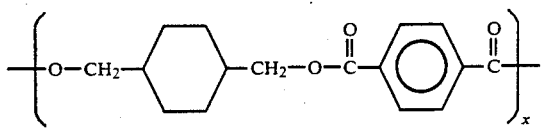

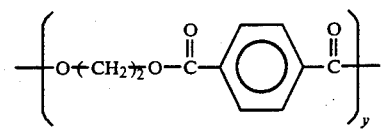

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°-30° C.

Polyester elastomers preferably comprise a block copolymer consisting of (1) polyester segments and (2) polyether or poly(etherimide) segments Preferred are polyester segments comprising poly(1,4-butylene terephthalate) and polyether or poly(etherimide) segments comprising a polyalkylene ether glycol, or an imide acid capped polyalkylene ether diamine, or a mixture of such segments.

The poly(etherester) elastomer (iii) for use as a component in the invention is a block copolymer consisting of polyester segments and polyether segments having molecular weights of 400 to 20,000. The polyester segment consists of a polyester obtained by condensation of an aromatic dicarboxylic acid with an alkylene glycol. Examples of this segment are as cited above in the case of the saturated polyester. Preferred examples of this segment are poly(1,4-butylene terephthalate) and poly(ethylene terephthalate). On the other hand, the polyether segment consists of a polyalkylene ether glycol, e.g. poly(ethylene oxide) glycol, poly(tetramethylene oxide) glycol, poly(propylene oxide) glycol, or a mixture thereof; an aliphatic polyester, e.g. a polyester resulting from the reaction of an aliphatic dicarboxylic acid of 2 to 12 carbon atoms with an aliphatic glycol of 2 to 10 carbon atoms, more specifically, polyethylene adipate, polytetramethylene adipate, polyethylene sebacate, polyneopentyl sebacate, polyhexamethylene azelate, or poly-α-caprolactone. The content of the polyether segment in the poly(etherester) elastomer is preferably from 2 to 80 percent by weight.

The poly(etherimide ester) elastomers (iv) used herein may be prepared from one or more diols, one or more dicarboxylic acids and one or more high molecular weight polyoxyalkylene diimide diacids. Preparation of such materials is described in detail in U.S. Pat. No. 4,556,705 of R. J. McCready, issued Dec. 3, 1985 and hereby incorporated by reference.

The poly(etherimide ester) elastomers used herein may be prepared by conventional processes, such as esterification and condensation reactions for the production of polyesters, to provide random or block copolymers. Thus, poly(etherimide esters) may be generally characterized as the reaction product of the aforementioned diols and acids.

The polyphenylene ether resin (v) in the invention is a homopolymer or copolymer represented by the formula

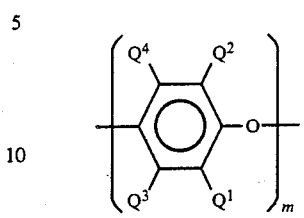

wherein $Q^1$ through $Q^4$ are selected independently of each other from the group consisting of hydrogen and hydrocarbon radicals and m denotes a number of 30 or more.

Examples of such polyphenylene ether resins include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl-1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether. Particularly preferred is a poly(2,6-dimethyl-1,4-phenylene)ether resin. There is no particular restriction on the polymerization degree of the polyphenylene ether resin used in the invention, but it is preferable to use the resin having a reduced viscosity of 0.3 to 0.7 dl/g measured in chloroform at 25° C. Resins having a less reduced viscosity than 0.3 dl/g tend to exhibit low heat stability while resins having a reduced viscosity exceeding 0.7 dl/g tend to have inferior moldability.

A preferred composition comprises a mixture (A-1) comprising (i) a polycarbonate resin and (ii) a saturated polyester resin.

The multi-stage polyorganosiloxane-based graft polymers may be prepared with or without the incorporation of a vinyl-based polymer. Where incorporation of the vinyl-based polymer is desired, the process is generally described hereinbelow by a co-homopolymerization process.

Co-homopolymerization refers to a polymerization step where two distinct polymerization mechanisms are effected concurrently, including simultaneously. In particular, the first stage co-hompolymerization may encompass a siloxane polymerization (e.g., ring opening and condensation mechanism) in conjunction with a concurrent vinyl polymerization. The discrete mechanisms are not seen as competing with each other, but rather, two homopolymers are concurrently produced each retaining its own structure.

The co-homopolymerization process may provide two discrete networks rather than a random copolymer. While not intending to be bound by any theory, it is possible that the network(s) comprises two or more distinct interpenetrating polymer phases, which provide the additional strength needed in the polyorganosiloxane. This is evidenced by the two distinct glass transition temperatures which can be detected by differential scanning calorimetr. Preferably, the product of the co-homopolymerization process is rubberty instead of a resin-like powder.

Subsequent to the co-homopolymerization of the siloxanes and vinyl-based monomers of the first step, at least one additional graft polymerization process is utilized to achieve the multi-stage polyorganosiloxane/-polyvinyl-based graft polymers of the present invention.

The subsequent graft polymerization is preferably of at least one vinyl-based type monomer. It has been found that a styrene/acrylonitrile copolymer, an alkyl(-meth)acrylate polymer or alkyl(meth)acrylate/acrylonitrile copolymer is particularly effective as the second stage graft polymer or copolymer, or as the outermost stage when intermediary stages are optionally utilized, and when two modifier compositions are utilized in combination.

The foregoing polyorganosiloxane/polyvinyl-based graft polymer can be isolated and utilized, for example, as an impact improving agent for thermoplastic resins as will be discussed in detail below.

Additional cross-linking and/or graft-linking agent can be utilized in this initial stage to provide co-homopolymerized networks from both polymeric constituents which provide greater rubber integrity.

The first stage rubbery substrate is provided by a series of sequential processing steps. In a premixing step the ingredients required for the reaction of the organosiloxane(s) and optional vinyl-based monomer(s) are premixed with water and suitable cross-linker(s), graft-linker(s), initiator(s) and surfactant(s). The premixed ingredients are homogenized by conventional means. The reactions may begin at this early stage of the process but these reactions are generally slow at room temperature. The homogenized reactants may be directed to a reactor vessel, typically stainless steel or glass flasks, under a nitrogen blanket. Heat is applied to facilitate the reaction. For typical 5 to 50 gallon stainless steel reactors, a 3 to 6 hour residence time at 75 to 90 degrees centigrade is adequate to complete the co-homopolymerization. Cooling for 2 to 6 hours will typically reduce the temperature to at least room temperature where the reaction mass can be held for 3 to 72 hours. Cooling to lower temperatures (e.g. 5 degrees centigrade) may sometimes be preferred since this may enhance the properties of the newly formed polyorganosiloxane/polyvinyl-based substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/ polyvinyl-based substrate.

The initiator for the siloxane component can be any ionic ring opening type initiator when cyclic siloxanes are utilized, such as alkylarylsulfonic acids, alkyldiaryldisulfonic acids, alkylsulfonic acids, and the like. The best suited example is dodecylbenzenesulfonic acid which can act as an initiator and at the same time as an emulsifier. In some cases, the joint use of a metal salt of an aforementioned sulfonic acid is also preferred.

The initiator for the optional styrenic or other vinyl-based monomers in the co-homopolymerization process can be any organic soluble radical initiator, such as azobisisobutyronitrile (AIBN) and the organic peroxides, e.g. benzoyl peroxide, dichlorobenzoyl peroxide, and tert-butyl perbenzoate. Also suitable are water-soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale, a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl-based substrate. This substrate is the first stage of the graft polymer of the present invention. Optionally, a first stage comprising an organosiloxane polymer with units derived from a cross-linking agent or agents and optionally units which serve as a graft-linking agent or agents may be employed. The organosiloxane polymer can be prepared in a manner according to the prior art, e.g. European Patent Application No. 0,166,900. Also contemplated are mixtures of the co-homopolymerized substrate with silicone substrates.

The next stage involves the graft polymerization of additional vinyl-functional moieties onto graft sites provided by the rubbery substrate particles on the latex formed in the first stage.

The grafted polymers will preferably be the product of a vinyl polymerization process. Suitable vinyl monomers for graft polymerization include, without limitation, alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; other vinyl compounds such as acrylamides, N-(mono or di-substituted)alkyl acrylamides, vinyl acetate, vinyl chloride, vinyl alkyl ethers, allyl (meth)acrylate, triallyl isocyannurate, ethylene dimethacrylate, diallyl maleate, maleic anhydride; maleimide compounds such as maleimide, and N-phenyl (or alkyl) maleimide; and mixtures of these monomers.

Preferred vinyl-based polymers of subsequent stages (1)(b) and (2)(b) in the organosiloxane-based or the organosiloxane/vinyl-based polymers comprise at least one selected from the group consisting of alkenyl aromatic compounds, (meth)acrylate compounds, vinyl cyanide compounds, maleimide compounds and acrylamide compounds. Especially preferred are polystyrene, poly(methyl methacrylate), styrene/acrylonitrile copolymer, styrene/methyl methacrylate copolymer and methyl methacrylate/acrylonitrile copolymer.

The vinyl polymerization is accomplished in an emulsion; therefore, water-soluble initiators are suitable, e.g. potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized organosiloxane/vinyl-based substrate. This substrate may have sufficient grafting sites for a second or subsequent stage to be grafted thereto. Grafted polystyrene, poly(meth)acrylate, styrene/acrylonitrile copolymer, methyl methacrylate/acrylonitrile copolymer or styrene/divinylbenzene copolymer as the outermost stage is preferred, yet many other intermediary stages such as a butyl acrylate stage are also contemplated. Furthermore, the grafting of additional stages of the same or different kinds is also possible.

The organosiloxanes useful in the first stage of the composition are any of those known to produce silicone elastomers and may include those which are hydroxy-, vinyl-, hydride- or mercapto- end capped linear organosiloxane oligomers.

The polyorganosiloxanes will be comprised primarily of units of the formula

wherein R is hydrogen or a monovalent hydrocarbon radical of about 1 to 16 carbon atoms and n is 0, 1 or 2.

Preferred among the organosiloxanes are those in cyclic form having three or more siloxane units, and most preferred are those having three to six units. Such organosiloxanes include, without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl-based monomers useful in conjunction with the co-homopolymerization of organosiloxanes in the first stage are preferred to be alkenyl aromatic compounds such as styrene, divinylbenzene, alpha-methylstyrene, vinyl toluene, vinyl naphthalene, vinyl anthracene, and halogenated styrene or its derivatives. Other suitable vinyl-based monomers include acrylic acids and acrylates such as methyl-, ethyl-, alkyl-, or butylacrylate; methacrylates such as methyl methacrylate, or 2-ethylhexyl methacrylate; vinyl cyanides such as acrylonitrile, and methacrylonitrile; olefins such as ethylene, propylene, butadiene, isoprene, and chloroprene; and other vinyl compounds such as vinyl imidazole, 5-vinyl2-norbornene, vinyl pyridine, vinyl pyrrolidinone, vinyl acetate, vinyl alkyl ethers, vinyl chloride, vinyl furan, N-vinylcarbazole, allyl (meth)acrylate, triallyl isocyanurate, ethylene di(meth)acrylate, butylene di(meth)acrylate, diallyl maleate, and maleic anhydride; maleimide compounds such as maleimide, and N-phenyl (or alkyl) maleimides; acrylamides; N-(mono or disubstituted) acrylamides; and mixtures of any of these monomers. In general, any rubbery or glassy vinyl type monomer may be used which can be mixable with the organosiloxane.

Preferred vinyl-based polymer components of the first stage substrate of the polyorganosiloxane/polyvinyl-based graft copolymer comprise primarily alkenyl aromatic units, (meth)acrylate units or mixtures thereof. Especially preferred is polystyrene.

Typically, the vinyl-based component of the first stage co-homopolymer will be present in an amount of approximately 3 to 97 weight percent and correspondingly the organosiloxane component will be present in an amount of approximately 97 to 3 weight percent. Preferably, the vinyl-based component will comprise approximately 5 to 45 weight percent of the first stage of the co-homopolymerized substrate.

The cross-linker composition used in conjunction with the organosiloxane component of the present compositions can have the general formula:

wherein n is 0, 1 or 2, preferably 0 or 1, and each $R^1$ independently represents hydrogen or a monovalent hydrocarbon radical selected from among alkyl or aryl radicals having 1 to 16 carbon atoms, preferably methyl, ethyl and phenyl. $R_2$ can be the same as $R^1$ or can be a vinyl, alkenyl, thio, or (meth)acryloxy alkyl functional radical. When $R_2$ is a vinyl, alkenyl, thio or acryloxy alkyl radical and n is 1, the cross-linker compound can also act as a graft-linker.

A preferred cross-linker compound is tetra-ethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75 to 95° C. When the latex is added, with agitation, the graft product will precipitate and can be held at an elevated temperature for about 10 minutes whereupon it may be filter washed. Commerical latex isolation techniques such as spray dryers may also be utilized.

The diene rubber-based graft polymer compositions comprise a first stage substrate of units derived from a diene rubber and optionally units derived from a cross-linking agent or agents. Dienes are generally classified as hydrocarbon-based molecules having at least two conjugated double bonds. Other examples of diene rubbers are styrene/butadiene rubber, acrylonitrile/butadiene, isoprene rubber, chloroprene rubber or 1,3-dimethylbutadiene rubber.

Vinyl-based polymers useful in the subsequent stages of the diene rubber-based graft copolymer are selected from alkenyl aromatic compounds, (meth)acrylate compounds, vinyl cyanide compounds and acrylamide compounds.

Alkenyl aromatic polymer resins useful as component (b) are, in general, those having at least 25 percent of their units derived from a monomer having the formula

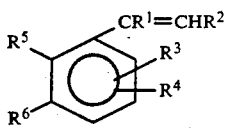

wherein $R^1$ and $R_2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the units of the alkenyl aromatic monomer include those having the general formula:

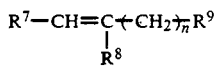

wherein $R^7$ and represent a substituent selected from the group consisting of hydrogen, halogen, an alkyl group of 1–4 carbon atoms, carboalkoxy or $R^7$ and $R^8$ taken together represent an anhydride linkage (—COOOC—), and $R^9$ is hydrogen, vinyl, an alkyl or alkenyl group having 1 to 12 carbon atoms, cycloalkyl, carboalkoxy, alkoxy-alkyl, alkyl carboxyl, ketoxy, halogen, carboxy, cyano or pyridyl and n is O or a whole number between 1 and 9.

(Meth)acrylates are generally produced in a two-step process wherein an acetone is reacted with a hydrogen cyanide to form an acetone cyanohydrin which is then heated in the presence of an alcohol to produce the (meth)acrylate. Preferred (meth)acrylates are methyl acrylate, ethyl acrylate, butyl acrylate and methyl methacrylate.

Vinyl cyanides useful in the practice of the present invention are comprised of the following general formula

wherein $R_1$ is an alkyl group of from 1 to 6 carbon atoms.

Acrylamides are well known in the art and generally comprise hydrocarbons having a group comprising the following general formula

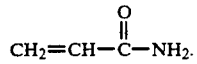

Preferred embodiments of the diene rubber-based graft polymer are a first stage (a)(ii) comprising units of a polybutadiene rubber and subsequent stage or stages (b) comprising poly(methyl methacrylate), methyl methacrylate/styrene copolymer or methyl methacrylate/acrylonitrile copolymer.

The thermoplastic resin composition may also contain an effective amount of any suitable additives such as addition rubbers, polymers, fillers, pigments, waxes, lubricants, processing assistants, dyes, antioxidants, heat stabilizers, ultraviolet light absorbers and mold release agents.

The reinforcing filler can be comprised of any organic or inorganic filler including but not limited to glass fiber, carbon fiber, aramid fiber, metallic fiber, whisker, glass beads, glass flakes, calcium carbonate, talc, mica, aluminum oxide, magnesium hydroxide, boron extrude, beryllium oxide, calcium silicate, clay or metal powder.

Platinum compounds are often utilized in conjunction with polyorganosiloxane compositions in order to enhance the flame retardance of the latter. Platinum complexes are also used as catalysts in certain hydrosilation processes although such catalysts are not necessary for the practice of the present invention. As flame retarding additives, however, there may be utilized the reaction product of chloroplatinic acid and organosilicon compounds as described in U.S. Pat. No. 3,220,972. Another platinum compound is seen in U.S. Pat. No. 3,775,452 describing platinum-containing polyorganosiloxanes. Other fire retardants are compounds based on elementary red phosphorous compounds, other phosphorous compounds, halogens, antimony oxides, iron oxides, zinc oxides and the like.

Preferably, component A, A-1, A-2, A-3 or A-4 comprises from 1 to 99 parts by weight and component B comprises from 99 to 1 part by weight per 100 parts by weight of A, A-1, A-2, A-3 or A-4 and B combined. Modifier composition (B) is comprised of from 1 to 99 parts by weight of component (1) and from 99 to 1 part by weight of component (2) based upon 100 parts by weight of (B).

When the polyphasic resin composition comprises the preferred embodiment of mixture (A-1) comprising (i) a polycarbonate resin phase and (ii) a saturated polyester resin phase and modifier composition (B) comprising two polyorganosiloxane/polyvinyl-based graft polymers, in combination, component (A-1) preferably comprises from about 99 to about 37 parts by weight and component (B) comprises from about 1 to about 63 parts by weight per 100 parts by weight of (A-1) and (B) together.

In general, the first stage comprising the polyorganosiloxane-based polymer substrate, the diene rubber-based polymer substrate or the co-homopolymerized polyorganosiloxane/polyvinyl-based substrate each will independently comprise approximately 5 to 95 weight percent of the corresponding total graft polymer based upon the weight of the first stage and the subsequent stage or stages taken together. Preferably the first stage will comprise approximately 30 to 90 weight percent on the same basis. Correspondingly, the subsequent stages, comprising the additional grafted vinyl polymers, will comprise approximately 95 to 5 weight percent and preferably approximately 70 to 10 weight percent on the same basis. In the multi-stage systems, preferably, the ratio of first stage substrate (1)(a) and/or (2)(a) to second stage polymer (b)(i) is 10:90 to 90:10 and the amount of third stage polymer (b)(ii) comprises from about 10 to about 90 parts by weight of (1)(a) and/or (2)(a), (b)(i) and (b)(ii) combined.

Subsequent stages (1)(b) and (2)(b) may differ in the selection of monomeric units which comprise the polymers or may differ in the ratio of the same monomeric units in each of the subsequent stages to each other which comprise the polymers.

The amount of polymerized or copolymerized (meth)acrylonitrile units in the outermost stage of each of the components, (1) and (2) of modifier composition (B) based upon the weight of the corresponding outermost stage will determine into which phase of the resin blend the particular graft polymer will be induced to migrate and finally to segregate. For example, in a modified (PC)/(PBT) blend, it is believed that such segregation is dictated by the interfacial energy variations between the modifiers and the resins comprising the blend, with the components having outermost stages with higher levels of polymerized or copolymerized (meth)acrylonitrile migrating to the more brittle PBT phase and the components having outermost stages with either no or low levels of (meth)acrylonitrile migrating to the PC phase. Therefore, by varying the amount of polymerized or copolymerized (meth)acrylonitrile in the outermost stage of the components of a multi-component modifier, portions of the modifier can be distributed in each phase of the blend resulting in two or more phases of the blend being simultaneously modified. As a result, improved impact modification and particularly superior low temperature toughness and lower ductile/brittle transition of multi-phase blends is accomplished by this dual-phase modification as compared to blends having modifiers in only one resin phase. Additionally, the processing difficulties associated with melt grafting chemistry are eliminated.

Preferably, the content of polymerized or copolymerized (meth)acrylonitrile units in the outermost stage of multi-stage composition (1) ranges from 0 to less than about 20 percent by weight of that outermost stage, and the content of polymerized or copolymerized (meth)acrylonitrile units in the outermost stage of multi-stage composition (2) ranges upwardly from greater than about 20 percent by weight of that outermost stage. Most preferably, the content of polymerized or copolymerized (meth)acrylonitrile units in the outermost stage of multi-stage composition (1) ranges from 0 to about 5 percent by weight of that outermost stage, and the content of polymerized or copolymerized (meth)acrylonitrile units in the outermost stage of multi-stage composition (2) ranges upwardly from greater than about 25 percent by weight of that outermost stage.

It is believed that in a polyphasic resin composition comprised of (A-1)(i) a polycarbonate resin phase and (ii) a saturated polyester resin phase, incorporation of a major fraction of the modifier in the more brittle PBT phase is important in achieving maximum low temperature toughness.

DESCRIPTION OF THE PREFERRED EMBODIMENTS

The following examples illustrate the invention without limitation. All parts are given by weight unless otherwise indicated. Impact strengths are reported as notched Izod (NI) according to ASTM D-256 at room temperature (23° C.) unless otherwise specified and as Charpy NI in a falling weight test. Weld line strength (DG) is measured on one-eighth inch unnotched Izod bars molded in a double-gated mold. Tensile properties are measured by ASTM D-638 as Tensile Yield Strength, Tensile Break Strength, Tensile Modulus, Elongation at Yield and Elongation at Break. Surface gloss, 60°, is measured by ASTM D-523, and Delta Yellowness Index is measured by yellowness index increase after aging for 96 hours at 125° C.

A single slash is used between monomers of a single stage, and a double slash or a hyphen is used as a shorthand method of indicating separation between stages. The first stage to be polymerized is written first before the double slash or hyphen, and subsequent stages are written subsequently.

EXAMPLE 1

A well mixed dry blend of 50 parts of polycarbonate (Lexan ® 141), 40 parts of saturated polyester (Valox ® 315), 0.9 part of a stabilizer package, 2.5 parts of a CSiM modifier ((Si/PS)-MMA wt. ratio of 70:30, Si/PS wt. ratio of 95:5) and 7.5 parts of a CSiM modifier ((Si/PS)-S/AN wt. ratio of 70:30, Si/PS wt. ratio of 95:5, S/AN wt. ratio of 75:25) is extruded on a Welding Engineers twin screw extruder operating at 400 rpm (65 gm/min) with barrel zones set at 250, 375, 510, 510, 510 and 510° F. Tensile and notched Izod bars are molded in a Boy injection molding machine at 280° C. A sample is also thermally aged at 120° C. for 168 hours. Tests on both aged and non-aged samples are conducted according to the above methods. Segregation of the two CSiM modifiers is illustrated in FIG. 1. The CSiM modifier ((Si/PS)-MMA wt. ratio of 70:30, Si/PS wt. ratio of 95:5) (5) appears as separate particles in the polycarbonate (1) phase of the PC(1)/PBT(3) blend, and the CSiM modifier ((Si/PS)-S/AN wt. ratio of 70:30, Si/PS wt. ratio of 95:5, S/AN wt. ratio of 75:25) (7) appears in the PBT (3) phase of the PC(1)/PBT(3) blend of the non-aged sample. Properties are summarized in Table 1.

COMPARATIVE EXAMPLE 1A*

Figure 2:
FIG. 2 is a transmission electron micrograph of a polyphasic blend of PC, PBT, and CSiM modifier ((Si/PS)-S/AN wt. ratio of 70:30, Si/PS wt. ratio of 95:5, S/AN wt. ratio of 75:25), stained with OsO4 and RuO$_4$, showing complete segregation of the modifier in the PBT phase.

The procedure of Example 1 is followed substituting a dry blend of 50 parts of polycarbonate (Lexan ® 141), 40 parts of saturated polyester (Valox ® 315), 0.9 part of a stabilizer package and 10 parts of a CSiM modifier ((Si/PS)-S/AN wt. ratio of 70:30, Si/PS wt. ratio of 95:5, S/AN wt. ratio of 75:25). FIG. 2 illustrates the complete segregation of the CSiM modifier ((Si/PS)-S/AN wt. ratio of 70:30, Si/PS wt. ratio of 95:5, S/AN wt. ratio of 75:25) (7) in the PBT(3) phase of the PC(1)/PBT(3) blend of the non-aged sample. Properties are summarized in Table 1.

COMPARATIVE EXAMPLE 1B*

Figure 3:
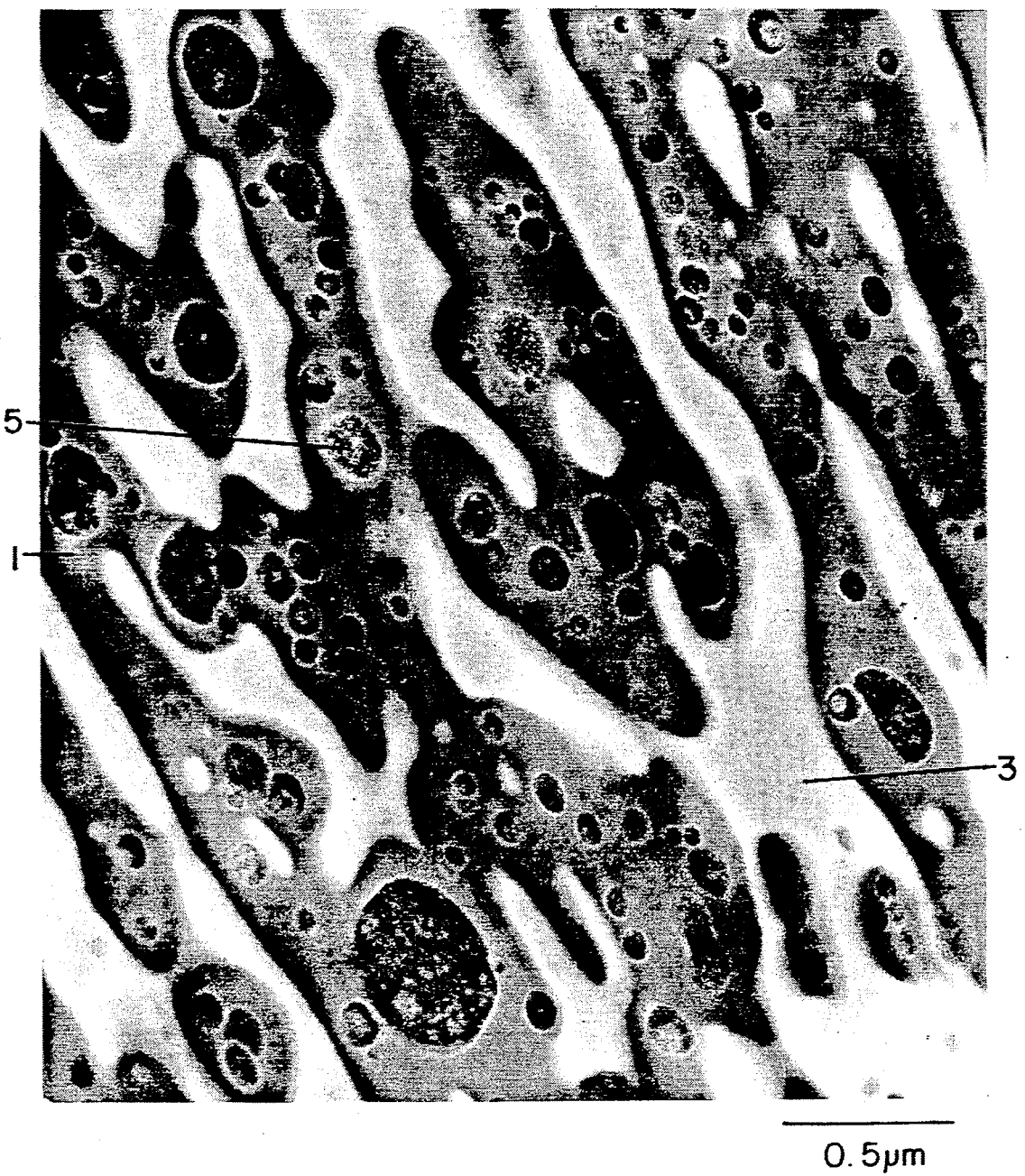
FIG. 3 is a transmission electron micrograph of a polyphasic blend of PC, PBT, and CSiM modifier ((Si/PS)-MMA wt. ratio of 70:30, Si/PS wt. ratio of 95:5), stained with OsO$_4$ and RuO$_4$, showing complete segregation of the modifier in the PC phase.

The procedure of Example 1 is followed substituting a dry blend of 50 parts of polycarbonate (Lexan ® 141), 40 parts of saturated polyester (Valox ® 315), 0.9 part of a stabilizer package, and 10 parts of a CSiM modifier ((Si/PS)-MMA wt. ratio of 70:30, Si/PS wt. ratio of 95:5). Thermal aging is carried out at 90° C. for 96 hours. FIG. 3 illustrates the complete segregation of the CSiM modifier ((Si/PS)-MMA, wt. ratio of 70:30, Si/PS wt. ratio of 95:5) (5) in the PC(1) phase of the PC(1)/PBT(3) blend of the non-aged sample. Properties are summarized in Table 1.

EXAMPLE 2

The procedure of Example 1 is followed substituting a dry blend of 50 parts of polycarbonate (Lexan ® 141), 40 parts of saturated polyester (Valox ® 315), 0.9 part of a stabilizer package, 7.5 parts of a CSiM modifier ((Si/PS)-MMA/AN wt. ratio of 70:30, Si/PS wt. ratio of 95:5, MMA/AN wt. ratio of 75:25) and 2.5 parts of a CSiM modifier ((Si/PS)-MMA wt. ratio of 70:30, Si/PS wt. ratio of 95:5). Properties are summarized in Table 1.

COMPARATIVE EXAMPLE 2A*

The procedure of Example 1 is followed substituting a dry blend of 50 parts of polycarbonate (Lexan ® 141), 40 parts of saturated polyester (Valox ® 315), 0.9 part of a stabilizer package, and 10 parts of a CSiM ((Si/PS)-MMA/AN wt. ratio of 70:30, Si/PS wt. ratio of 95:5, MMA/AN wt. ratio of 75:25). FIG. 4 illustrates the complete segregation of the CSiM modifier ((Si/PS)-MMA/AN wt. ratio of 70:30, Si/PS wt. ratio of 95:5, MMA/AN wt. ratio of 75:25) in the PBT(3) phase of the PC(1)/PBT(3) blend of the non-aged sample. Properties are summarized in Table 1.

EXAMPLE 3

The procedure of Example 1 is followed substituting a dry blend of 50 parts of polycarbonate (Lexan ® 141), 40 parts of saturated polyester (Valox ® 315), 0.9 part of a stabilizer package, 7.5 parts of a CSiM modifier ((Si/PS)-MMA/AN wt. ratio of 70:30, Si/PS wt. ratio of 95:5, MMA/AN wt. ratio of 75:25) and 2.5 parts of a CSiM modifier ((Si/PS)-MMA/AN wt. ratio of 70:30, Si/PS wt. ratio of 95:5, MMA/AN wt. ratio of 95:5). Properties are summarized in Table 1.

COMPARATIVE EXAMPLE 3A*

Figure 5:
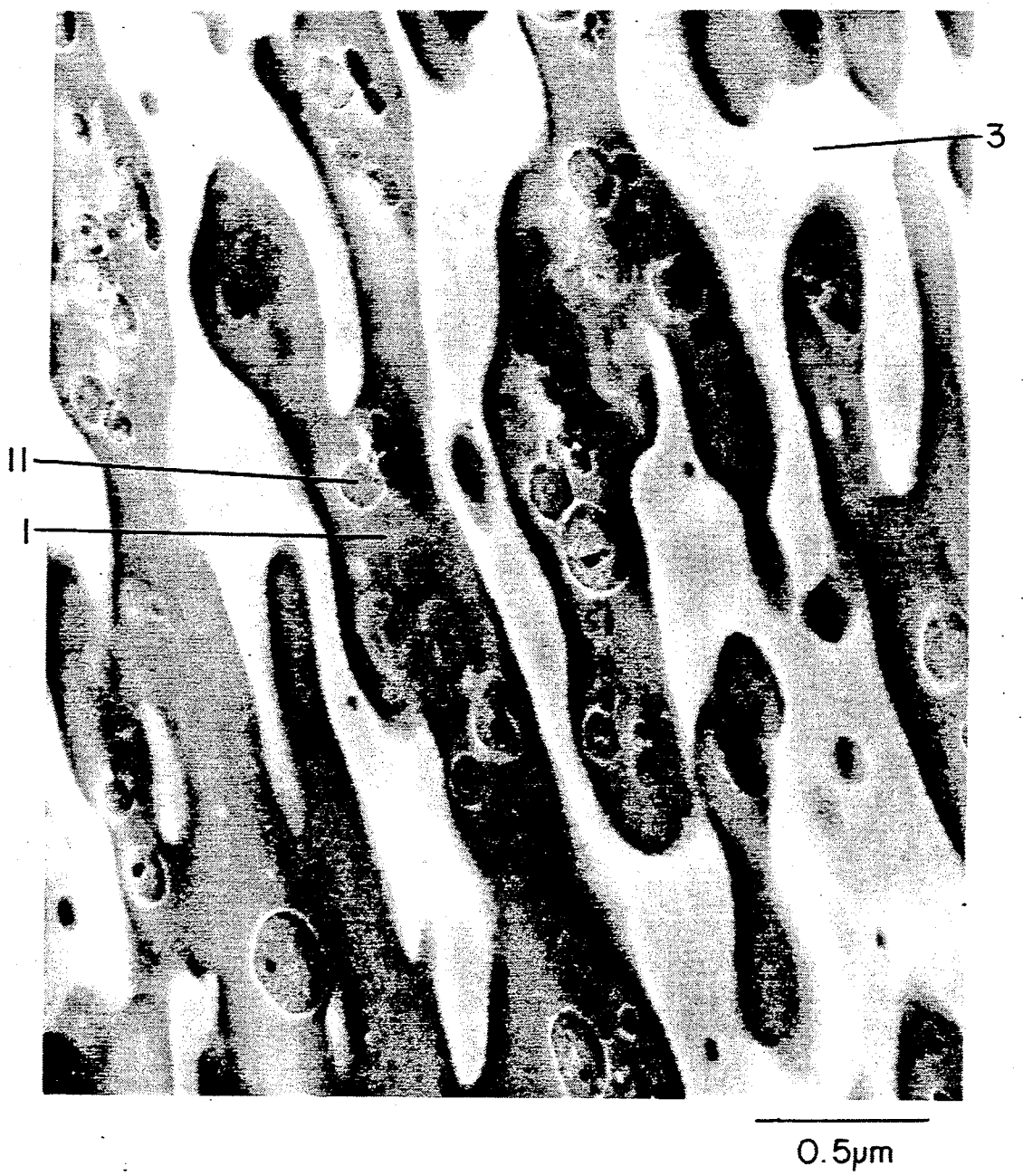
FIG. 5 is a transmission electron micrograph of a polyphasic blend of PC, PBT, and CSiM modifier ((Si/PS)-MMA/AN wt. ratio of 70:30, Si/PS wt. ratio of 95:5, MMA/AN wt. ratio of 95:5), stained with OsO$_4$ and RuO$_4$, showing the complete segregation of the modifier in the PC phase.

The procedure of Example 1 is followed substituting a dry blend of 50 parts of polycarbonate (Lexan ® 141), 40 parts of saturated polyester (Valox ® 315), 0.9 part of a stabilizer package, and 10 parts of a CSiM ((Si/PS)-MMA/AN wt. ratio of 70:30, Si/PS wt. ratio of 95:5, MMA/AN wt. ratio of 95:5). FIG. 5 illustrates the complete segregation of the CSiM modifier ((Si/PS)-MMA/AN wt. ratio of 70:30, Si/PS wt. ratio of 95:5, MMA/AN wt. ratio of 95:5) (11) in the PC(1) phase of the PC(1)/PBT(3) blend of the non-aged sample. Properties are summarized in Table 1.

Inspection of Table 1 below shows that the polyphasic resin blends of Examples 1, 2 and 3, which have CSiM modifier in both resin phases, have significantly lower ductile/brittle transition, i.e. −45° C., than Comparative Examples 1A*, 1B*, 2A* and 3A* which have modifier in only one resin phase. The dual-phase modified blends achieve optimum levels of toughening, particularly at low temperatures, as is seen by the impact strengths of Examples 1, 2 and 3 when compared with the Comparative Examples at −30° C. and lower. The incorporation of a major portion of the impact modifier in the more brittle PBT phase appears to be important in achieving maximum low temperature toughness, again as illustrated by Examples 1, 2 and 3. FIGS. 1, 3 and 5 show that when little or no (meth)acrylonitrile units are present in the outermost stage of a component that the modifier component segregates in the polycarbonate phase of the PC/PBT blend. FIGS. 1, 2 and 4 show that when higher amounts, such as at least 25 percent by weight, of (meth)acrylonitrile units are present in the outermost stage of the modifier component, the modifier component segregates in the PBT phase of the PC/PBT blend.

TABLE 1

POLYCARBONATE/POLYESTER BLENDS CONTAINING CSiM's

| Example | 1 | 1A* | 1B* | 2 | 2A* | 3 | 3A* |
|---|---|---|---|---|---|---|---|
| Polycarbonate[A] | 50 | 50 | 50 | 50 | 50 | 50 | 50 |
| Polyester[B] | 40 | 40 | 40 | 40 | 40 | 40 | 40 |
| Stabilizers | 0.9 | 0.9 | 0.9 | 0.9 | 0.9 | 0.9 | 0.9 |
| CSiM[C] | 7.5 | 10 | — | — | — | — | — |
| CSiM[D] | 2.5 | — | 10 | 2.5 | — | — | — |
| CSiM[E] | — | — | — | — | — | 2.5 | 10 |
| CSiM[F] | — | — | — | 7.5 | 10 | 7.5 | — |
| Tensile Strength (psi) Yield | 7477 | 7524 | 7526 | 7549 | 7349 | 7515 | 7448 |
| (Thermally Aged 96 hrs at 90° C.) | (—) | (—) | (8565) | (—) | (—) | (—) | (—) |
| (Thermally Aged 168 hrs at 120° C.) | (8374) | (8546) | (—) | (8319) | (8113) | (8250) | (8327) |
| Break | 8716 | 7132 | 7072 | 7728 | 7925 | 8000 | 6440 |
| (Thermally Aged 96 hrs at 90° C.) | (—) | (—) | (7531) | (—) | (—) | (—) | (—) |
| (Thermally Aged 168 hrs at 120° C.) | (6359) | (5576) | (—) | (6987) | (7388) | (7576) | (6364) |
| Elongation at Break (%) | 196 | 157 | 124 | 180 | 198 | 191 | 123 |
| (Thermally Aged 96 hrs at 90° C.) | (—) | (—) | (121) | (—) | (—) | (—) | (—) |
| (Thermally Aged 168 hrs at 120° C.) | (65) | (37) | (—) | (128) | (152) | (163) | (72) |
| NI (ft-lbs/in) .125" | | | | | | | |
| 25° C. | 15.4 | 15.7 | 15.7 | 16.1 | 17.0 | 16.1 | 15.6 |
| 0° C. | 14.7 | 14.3 | 12.8 | 14.5 | 15.5 | 15.1 | 13.8 |
| −15° C. | 13.6 | 13.0 | 11.8 | 13.2 | 13.9 | 14.4 | 11.5 |
| −30° C. | 12.2 | 5.2 | 8.1 | 11.1 | 5.5 | 12.1 | 7.5 |
| −45° C. | 6.3 | — | — | 4.3 | — | 3.3 | — |
| (Thermally aged 96 hrs at 90° C.) | (—) | (—) | (14.0) | (—) | (—) | (—) | (—) |
| (Thermally aged | (14.1) | (13.8) | (—) | (14.4) | (15.4) | (14.4) | (14.0) |

TABLE 1-continued

POLYCARBONATE/POLYESTER BLENDS CONTAINING CSiM's

| Example | 1 | 1A* | 1B* | 2 | 2A* | 3 | 3A* |
|---|---|---|---|---|---|---|---|
| 168 hrs at 120° C.) | | | | | | | |

$^A$Lexan ® 141, poly(bisphenol-A carbonate), General Electric Company
$^B$Valox ® 315, poly(1,4-butylene terephthalate), General Electric Company
$^C$(Si/PS)-S/AN wt. ratio of 70:30, Si/PS wt. ratio of 95:5, S/AN wt. ratio of 75:25
$^D$(Si/PS)-MMA wt. ratio of 70:30, Si/PS wt. ratio of 95:5
$^E$(Si/PS)-MMA/AN wt. ratio of 70:30, Si/PS wt. ratio of 95:5, MMA/AN wt. ratio of 95:5
$^F$(Si/PS)-MMA/AN wt. ratio of 70:30, Si/PS wt. ratio of 95:5, MMA/AN wt. ratiio of 75:25

EXAMPLE 4

Figure 6:
FIG. 6 is a transmission electron micrograph of a polyphasic blend of PC, PBT, butadiene rubber substrate-S/MMA outermost stage modifier, and high rubber graft ABS modifier (A-B-S wt. ratio of 7.5:70:22.5), stained with OsO$_4$ and RuO$_4$, showing segregation of the butadiene rubber substrate S/MMA outermost stage modifier in the PC phase and the ABS modifier in the PBT phase.

A dry blend of 50 parts of polycarbonate (Lexan ® 141), 40 parts of saturated polyester (Valox ® 315), 0.9 part of a stabilizer package, 5 parts of a butadiene rubber substrate-S/MMA outermost stage modifier (Acryloid ® KM-653) and 5 parts of a high rubber graft ABS modifier (A-B-S wt. ratio of 7.5:70:22.5—U.S. Pat. No. 4,753,986) is compounded via a single pass extrusion process at 500° F. on a Welding Engineers twin screw extruder, pelletized, and molded. Segregation of these two modifiers is illustrated in FIG. 6. The KM-653 (13) modifier with no acrylonitrile in the outermost stage appears in the PC(1) phase and the ABS modifier (15) appears in the PBT (3) phase of the PC(1)/PBT(3) blend.

COMPARATIVE EXAMPLE 4A*

Figure 7:
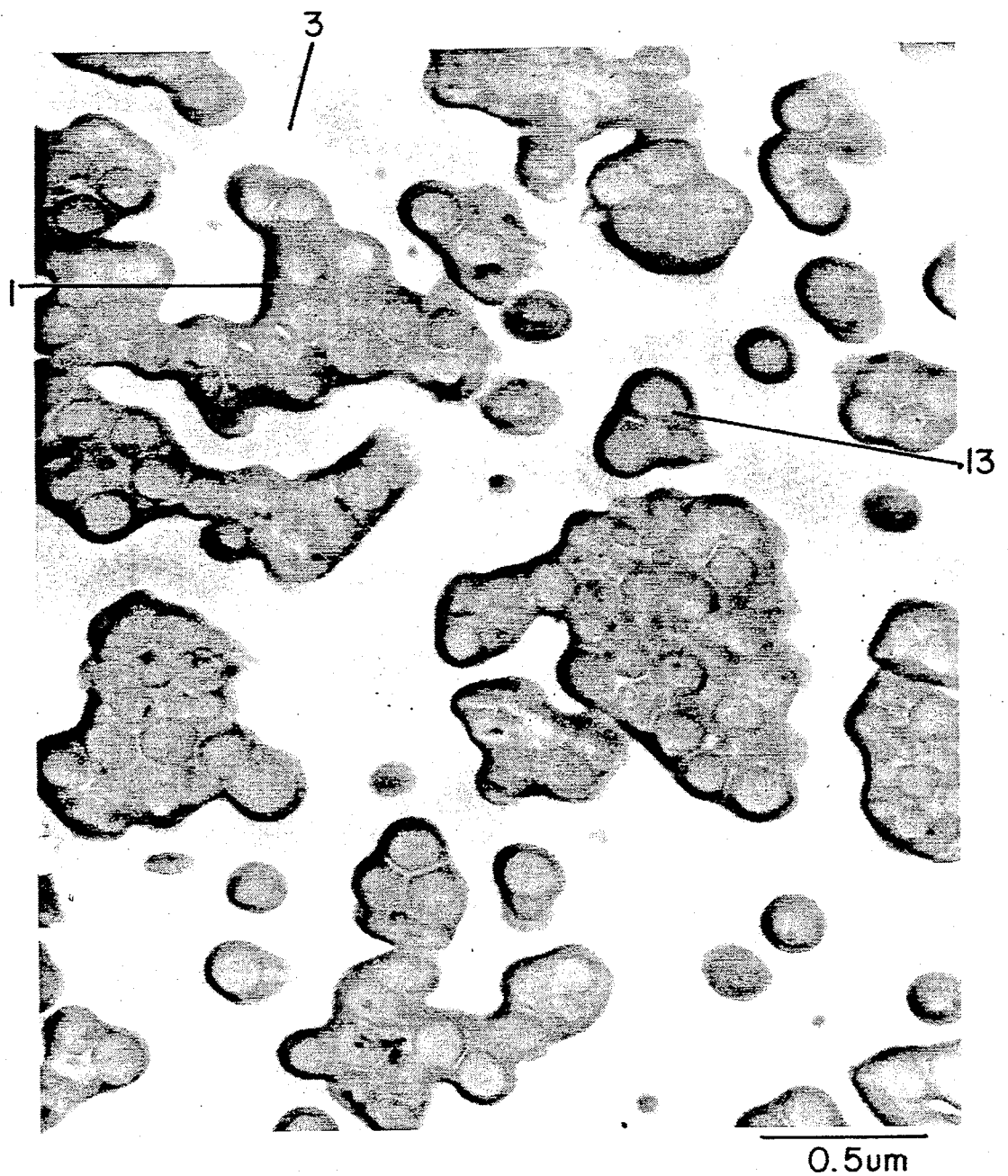
FIG. 7 is a transmission electron micrograph of a polyphasic blend of PC, PBT and a butadiene rubber substrate-S/MMA outermost stage modifier, stained with OsO$_4$ and RuO$_4$, showing the segregation of the modifier in the PC phase.

The procedure of Example 4 is followed substituting a dry blend of 15 parts of polycarbonate (Lexan ® 141), 70 parts of saturated polyester (Valox ® 315), 0.9 part of a stabilizer package, and 15 parts of a butadiene rubber substrate-S/MMA outermost stage modifier (Acryloid ® KM-653). FIG. 7 illustrates the segregation of the modifier (13) in the PC(1) of the PC(1)/PBT(3) blend.

EXAMPLE 5

The procedure of Example 1 is followed substituting a dry blend of 50 parts of polycarbonate resin (Lexan ® 141), 40 parts of saturated polyester resin (Valox. 315), 2.5 parts of a CSiM modifier ((Si/PS)-MMA wt. ratio of 70:30, Si/PS wt. ratio of 95:5) and 7.5 parts of a CSiM modifier ((Si/PS)-S/AN wt. ratio of 70:30, Si/PS wt. ratio of 95:5, S/AN wt. ratio of 75:25). A composition will be formed in accordance with the appended claims.

EXAMPLE 6

The procedure of Example 1 is followed substituting a dry blend of 50 parts of polycarbonate resin (Lexan ® 141), 40 parts of saturated polyester resin (Valox ® 315), 7.5 parts of a CSiM modifier ((Si/PS)-MMA/AN wt. ratio of 70:30, Si/PS wt. ratio of 95:5, MMA/AN wt. ratio of 75:25) and 2.5 parts of a CSiM modifier ((Si/PS)-MMA wt. ratio of 70:30, Si/PS wt. ratio of 95:5). A composition will be formed in accordance with the appended claims.

EXAMPLE 7

The procedure of Example 1 is followed substituting a dry blend of 50 parts of polycarbonate resin (Lexan ® 141), 40 parts of saturated polyester resin (Valox ® 315), 7.5 parts of a CSiM modifier ((Si/PS)-MMA/AN wt. ratio of 70:30, Si/PS wt. ratio of 95:5, MMA/AN wt. ratio of 75:25) and 2.5 parts of a CSiM modifier ((Si/PS)-MMA/AN wt. ratio of 70:30, Si/PS wt. ratio of 95:5, MMA/AN wt. ratio of 95:5). A composition will be formed in accordance with the appended claims.

EXAMPLE 8

The procedure of Example 1 is followed substituting a dry blend of 46 parts of saturated polyester resin (Valox ® 315), 30 parts of polyphenylene ether resin (PPE) (vacuum vented, 14 parts of polycarbonate resin (HI-LEX ®, poly(bisphenol-A carbonate), General Electric Company), 2.5 parts of a CSiM modifier ((Si/PS)-MMA wt. ratio of 70:30, Si/PS wt. ratio of 95:5) and 7.5 parts of a CSiM modifier ((Si/PS)-S/AN wt. ratio of 70:30, Si/PS wt. ratio of 95:5, S/AN wt. ratio of 75:25). A composition will be formed in accordance with the appended claims.

EXAMPLE 9

The procedure of Example 1 is followed substituting a dry blend of 46 parts of saturated polyester resin (Valox ® 315), 30 parts of polyphenylene ether resin (vacuum vented), 14 parts of polycarbonate resin (HI-LEX ®), 7.5 parts of a CSiM modifier ((Si/PS)-MMA/AN wt. ratio of 70:30, Si/PS wt. ratio of 95:5, MMA/AN wt. ratio of 75:25) and 2.5 parts of CSiM modifier ((Si/PS)-MMA wt. ratio of 70:30, Si/PS wt. ratio of 95:5). A composition will be formed in accordance with the appended claims.

EXAMPLE 10

The procedure of Example 1 is followed substituting a dry blend of 46 parts of saturated polyester resin (Valox ® 315), 30 parts of polyphenylene ether resin (vacuum vented), 14 parts of polycarbonate resin (HI-LEX ®), 7.5 parts of a CSiM modifier ((Si/PS)-MMA/AN wt. ratio of 70:30, Si/PS wt. ratio of 95:5, MMA/AN wt. ratio of 75:25) and 2.5 parts of a CSiM modifier ((Si/PS)-MMA/AN wt. ratio of 70:30, Si/PS wt. ratio of 95:5, MMA/AN wt. ratio of 95:5). A composition will be formed in accordance with the appended claims.

PROCEDURE A

General Procedure for Silicone Graft Copolymer (GSiM) Synthesis (ii-S/AN wt. ratio of 72:28, S/AN wt. ratio of 75:25)

To deionized water, 400 parts, containing 1.33 parts of dodecylbenzenesulfonic acid dissolved therein, is added a mixture comprising 90 parts of octamethylcyclotetrasiloxane, 5 parts of tetravinyltetramethylcyclotetrasiloxane, 5.5 parts of vinyltriethoxysilane, 1.7 parts of tetraethoxysilane, 1.43 parts of gammamethacryloxypropyltrimethoxysilane, 0.67 part of divinylbenzene and 0.093 part of a platinum catalyst (Silicone Product No. 88034). The emulsion is homogenized by passing twice through a homogenizer at a pressure of 7600 to 8600 psi. The emulsion is then stored for 5 hours at 75° C. and cooled for 13 hours overnight. The silicone emulsion is then neutralized to pH 7.5 by adding 5 parts of 15 percent aqueous potassium carbonate solution. The silicone rubber has a yield of about 83.5 percent, a gel content of about 71.3 percent and a 14.6 degree of swelling. The sol fraction possesses a Mw/Mn of 48,600/19,700 measured by gel permeation chromatography against polystyrene standards. To the core latex is then graft polymerized a 75/25 mixture of styrene/acrylonitrile for 6 hours at 75° C. which is persulfate initiated. The polymers are then isolated by coagulation and vacuum dried at 65° C. resulting in a silicone-styrene/acrylonitrile weight ratio of 72:28 based on final conversion. The S/AN graft efficiency is 25 percent.

PROCEDURE B

General Procedure for Silicone/Polystyrene Graft Copolymer (CSiM) Synthesis ((Si/PS)-S/AN wt. ratio of 70:30, S/AN wt. ratio of 75:25)

To 400 parts of deionized water containing 1.33 parts of dodecylbenzenesulfonic acid dissolved therein is admixed an organic mixture comprising 90 parts of octamethylcyclotetrasiloxane, 10 parts of tetravinyltetramethylcyclotetrasiloxane, 1.7 parts of tetraethoxysilane, 1.43 parts of gamma-methacryloxypropyltrimethoxysilane, 0.097 part of a platinum catalyst solution, 33.3 parts of styrene and 0.67 part of divinylbenzene. The mixture is stirred and then homogenized twice under an impinging pressure of about 8000 psi. The crude emulsion is then polymerized at 75° C. for 6 hours followed by overnight cooling down to room temperature. A potassium persulfate solution (0.17 part in 8.17 parts deionized water) is added over the first four hours at 75° C. as a styrene polymerization initiator. The silicone/polystyrene substrate emulsion is then quenched by neutralization from pH 1.7 to 8.1 following an optional addition of 0.67 part of GAFAC RE610 which is predissolved in 6 parts of deionized water. The silicone/polystyrene rubber has a polymerization yield of 87.3 percent, a mean diameter of 230 nm, a gel content of 78 percent and 13.6 degree of swelling. To the substrate latex is grafted polymerized a 75/25 S/AN mixture for a total of 6 hours at 75° C. using potassium persulfate as the initiator. The substrate to S/AN weight ratio is 70:30, and the second stage graft efficiency is measured at 60 percent using methyl ethyl ketone Soxhlet extraction.

PROCEDURE C

CSiM ((Si/BA)-S/AN wt. ratio of 70:30, S/AN wt. ratio of 75:25) Synthesis

Procedure B is followed substituting butyl acrylate (BA) for styrene as the vinyl-based polymer component of the substrate latex.

PROCEDURE D

General Procedure for Silicone/Polystyrene-BA-S/AN Graft Copolymer (CSiM) Synthesis (Si/PS)-BA-S/AN wt. ratio of 35:35:30, S/AN wt. ratio of 75:25)

The procedure of Procedure B is repeated to produce the silicone/polystyrene first stage substrate. However, at the second stage, to the silicone/polystyrene latex is added one stream containing butyl acrylate, butylene glycol diacrylate, diallyl maleate, deionized water and sodium dodecylbenzene sulfonate concurrently with another aqueous stream consisting of a water-soluble initiator over a period of 1 to 3 hours at 75° C. The butyl acrylate to the dry silicone/polystyrene substrate weight ratio is aimed at 35:35. The S/AN grafting procedure of Procedure B is then repeated as are the isolation steps.

PROCEDURE E

CSiM ((Si/PS)-PS wt. ratio of 70:30) Synthesis

Procedure B is followed substituting polystyrene for styrene/acrylonitrile copolymer as the graft stage.

PROCEDURE F

CSiM ((Si/PS)-MMA wt. ratio of 70:30) Synthesis

Procedure B is followed substituting poly-(methyl methacrylate) for styrene/acrylonitrile copolymer as the graft stage.

EXAMPLE 11

A dry blend of 39 parts of a saturated polyester resin (poly(1,4-butylene terephthalate), PBT, Valox® 315, General Electric Company), 45.75 parts of a polycarbonate resin (poly(bisphenol-A carbonate), Lexan® 141, General Electric Company), 7 parts of a GSiM modifier (Si-S/AN wt. ratio of 72:28, S/AN wt. ratio of 75:25) prepared by the method of Procedure A, 7 parts of a butadiene rubber substrate-S/MMA outermost stage modifier (Acryloid® KM-653, Rohm and Haas Company) and 1.25 parts of a stabilizer package are tumble mixed to give a homogeneous powder dispersion within the pellets. The blend is then fed into a Werner Pfleiderer 30 mm twin screw extruder under the following conditions:

| Screw Speed | 200 rpm |
|---|---|
| Throughput Rate | 20 lb/hr |
| Zone 1 | 195° C. |
| Zone 2 | 210° C. |
| Zone 3-5, die | 230-250° C. |

The extrudate is pelletized, dried at 140° F. and then injection molded on a 75 ton Newbury molding machine. A sample is then thermally aged at 125° C. for 96 hours. Tests on both aged and non-aged samples are conducted. Properties are summarized in Table 2.

COMPARATIVE EXAMPLE 11A*

The procedure of Example 11 is followed substituting a dry blend of 39 parts of saturated polyester (Valox® 315), 45.75 parts of polycarbonate (Lexan® 141), 14 parts of a butadiene rubber substrate-S/MMA outermost stage modifier (Acryloid® KM-653), and 1.25 parts of a stabilizer package. Properties are summarized in Table 2.

COMPARATIVE EXAMPLE 11B*

The procedure of Example 11 is followed substituting a dry blend of 39 parts of saturated polyester (Valox® 315), 45.75 parts of polycarbonate (Lexan® 141), 14 parts of a GSiM modifier (Si-S/AN wt. ratio of 72:28, S/AN wt. ratio of 75:25) prepared by the method of Procedure A and 1.25 parts of a stabilizer package. Properties are summarized in Table 2.

As is clearly demonstrated from Table 2 below, only the example containing both the diene-based modifier and the GSiM modifier in combination (Example 11) exhibits uniformly good physical properties, possessing good impact resistance, low temperature ductility, tensile strength, desirably low gloss, and resistance to yellowing and property loss because of thermal aging. The blend containing only the diene-based modifier (Comparative Example 11A*) while exhibiting good strength related characteristics, exhibits poor resistance to yellowing and has a high gloss. The blend containing only the GSiM modifier, (Comparative Example 11B*) does not exhibit good low temperature ductility in the blends, has poor thermal stability, and is inferior to the blend combination (Example 11) in most other respects as well.

TABLE 2
POLYESTER/POLYCARBONATE
GSiM MODIFIER BLENDS

| Example | 11 | 11A* | 11B* |
|---|---|---|---|
| Composition | | | |
| Polyester Resin[A] | 39 | 39 | 39 |
| Polycarbonate Resin[B] | 45.75 | 45.75 | 45.75 |
| KM-653[C] | 7 | 14 | — |
| GSiM[D] | 7 | — | 14 |
| Stabilizers | 1.25 | 1.25 | 1.25 |
| Properties | | | |
| 60° Gloss, % | 62.3 | 96.0 | 68.3 |
| NI @ R.T. (ft-lbs/in) .125" | | | |
| Non-Aged Sample | 12.6 | 12.1 | 11.4 |
| Thermally Aged Sample | 11.0 | 10.8 | 3.0 |
| Retention, % | 87.3 | 89.3 | 26.3 |
| Delta Yellow Index | 5.5 | 18.9 | 4.9 |
| Charpy NI, (ft-lbs/in) | | | |
| R.T. | — | — | 8.1 |
| 10° C. | — | — | 6.1 |
| 0° C. | 8.1 | 8.8 | 2.8 |
| −10° C. | 7.6 | 8.0 | 2.9 |
| −20° C. | 5.1 | 3.1 | — |
| −30° C. | 2.7 | 2.9 | 2.0 |
| Tensile Strength | | | |
| Yield, Kpsi | 6.7 | 8.1 | 6.9 |
| Break | 5.6 | 6.6 | 6.1 |
| Tensile Modulus Kpsi | 14.9 | 15.5 | 14.4 |
| Elongation, % | | | |
| Yield | 7.3 | 8.6 | 7.9 |
| Break | 42 | 169 | 29 |

[A]Valox ® 315, poly(1,4-butylene terephthalate), General Electric Company
[B]Lexan ® 141, poly(bisphenol-A carbonate), General Electric Company
[C]Acryloid ® KM-653, butadiene rubber substrate-S/MMA outermost stage, Rohm and Haas Company
[D]Si—S/AN wt. ratio of 72:28, S/AN wt. ratio of 75:25, Procedure A

EXAMPLE 12

The procedure of Example 11 is followed substituting a dry blend of 39 parts (780 grams) of saturated polyester (Valox ® 315), 44.75 parts (895 grams) of polycarbonate (Lexan ® 141), 1 part (20 grams) of polycarbonate (Lexan ® ML4545, poly(bisphenol-A carbonate), General Electric Company), 3.5 parts (70 grams) of a butadiene rubber substrate-S/MMA outermost stage modifier (Acryloid ® KM-653), 10.5 parts (210 grams) of a CSiM modifier ((Si/PS)-S/AN wt. ratio of 70:30, S/AN wt. ratio of 75:25) prepared by the method of Procedure B, 1 part (20 grams) of red colorant (Red 624) and 1.25 parts (25 grams) of a stabilizer package. Properties are summarized in Table 3.

COMPARATIVE EXAMPLE 12A*

The procedure of Example 11 is followed substituting a dry blend of 39 parts (780 grams) of saturated polyester (Valox ® 315), 44.75 parts (895 grams) of polycarbonate (Lexan ® 141), 1 part (20 grams) of polycarbonate (Lexan ® ML4545), 14 parts (280 grams) of a butadiene rubber substrate-S/MMA outermost stage modifier (Acryloid ® KM-653), 1 part (20 grams) of red colorant (Red 624) and 1.25 parts (25 grams) of a stabilizer package. Properties are summarized in Table 3.

COMPARATIVE EXAMPLE 12B*

The procedure of Example 11 is followed substituting a dry blend of 39 parts (780 grams) of saturated polyester (Valox ® 315), 44.75 parts (895 grams) of polycarbonate (Lexan ® 141), 1 part (20 grams) of polycarbonate (Lexan ® ML4545), 14 parts (280 grams) of a CSiM modifier ((Si/PS)-S/AN wt. ratio of 70:30, S/AN wt. ratio of 75:25) prepared by the method of Procedure B, 1 part (20 grams) of red colorant (Red 624) and 1.25 parts (25 grams) of a stabilizer package. Properties are summarized in Table 3.

EXAMPLE 13

The procedure of Example 11 is followed substituting a dry blend of 39 parts (780 grams) of saturated polyester (Valox ® 315), 44.75 parts (895 grams) of polycarbonate (Lexan ® 141), 1 part (20 grams) of polycarbonate (Lexan ® ML4545), 7 parts (140 grams) of a butadiene rubber substrate-S/MMA outermost stage modifier (Acryloid ® KM-653), 7 parts (140 grams) of a CSiM modifier ((Si/PS)-S/AN wt. ratio of 70:30, S/AN wt. ratio of 75:25) prepared by the method of Procedure B, 1 part (20 grams) of red colorant (Red 624) and 1.25 parts (25 grams) of a stabilizer package. Properties are summarized in Table 3.

EXAMPLE 14

The procedure of Example 11 is followed substituting a dry blend of 39 parts (780 grams) of saturated polyester (Valox ® 315), 44.75 parts (895 grams) of polycarbonate (Lexan ® 141), 1 part (20 grams) of polycarbonate (Lexan ® ML4545), 10.5 parts (210 grams) of a butadiene rubber substrate-S/MMA outermost stage modifier (Acryloid ® KM-653), 3.5 parts (70 grams) of a CSiM modifier ((Si/PS)-S/AN wt. ratio of 70:30, S/AN wt. ratio of 75:25) prepared by the method of Procedure B, 1 part (20 grams) of red colorant (Red 624) and 1.25 parts (25 grams) of a stabilizer package. Properties are summarized in Table 3.

As can be seen from Table 3 below, the samples containing the combined modifiers exhibit good impact resistance, appearance and low gloss characteristics. Comparative Example 12A* containing no CSiM, while exhibiting good strength characteristics, is glossy and thus not useful in desired low gloss applications.

TABLE 3
RED PIGMENTED BLENDS

| Examples | 12 | 12A* | 12B* | 13 | 14 |
|---|---|---|---|---|---|
| Polyester[A] | 39 | 39 | 39 | 39 | 39 |
| wt % (gms) | (780) | (780) | (780) | (780) | (780) |
| Polycarbonate[B] | 44.75 | 44.75 | 44.75 | 44.75 | 44.75 |
| wt % (gms) | (895) | (895) | (895) | (895) | (895) |
| Polycarbonate[C] | 1 | 1 | 1 | 1 | 1 |
| wt % (gms) | (20) | (20) | (20) | (20) | (20) |
| KM-653[D] | 3.5 | 14 | — | 7 | 10.5 |
| wt % (gms) | (70) | (280) | | (140) | (210) |
| CSiM[E] | 10.5 | — | 14 | 7 | 3.5 |
| wt % (gms) | (210) | | (280) | (140) | (70) |
| Red Colorant[F] | 1 | 1 | 1 | 1 | 1 |
| wt % (gms) | (20) | (20) | (20) | (20) | (20) |
| Stabilizers | 1.25 | 1.25 | 1.25 | 1.25 | 1.25 |
| wt % (gms) | (25) | (25) | (25) | (25) | (25) |
| Properties | | | | | |
| DG, ft-lbs/in | 20.0 | 32.2 | 13.7 | 24.3 | 28.6 |
| NI @ R.T., | | | | | |

TABLE 3-continued

| | RED PIGMENTED BLENDS | | | | |
|---|---|---|---|---|---|
| Examples | 12 | 12A* | 12B* | 13 | 14 |
| ft-lbs/in .125" | | | | | |
| Non-Aged Sample | 13.9 | 14.1 | 12.2 | 13.3 | 14.4 |
| Thermally Aged Sample | 9.8 | 12.0 | 2.9 | 11.1 | 12.3 |
| % Retention | 70.5 | 85.1 | 23.8 | 83.5 | 85.4 |
| Color Appearance | Dull | Good | Dull | Good | Good |
| 60° Gloss | 35.3 | 94.2 | 27.2 | 50.7 | 70.7 |

[A]Valox ® 315, poly(1,4-butylene terephthalate), General Electric Company
[B]Lexan ® 141, poly(bisphenol-A carbonate), General Electric Company
[C]Lexan ® ML4545, poly(bisphenol-A carbonate), General Electric Company
[D]Acryloid ® KM-653, butadiene rubber substrate-S/MMA outermost stage, Rohm and Haas Company
[E](Si/PS)-S/AN wt. ratio of 70:30, S/AN wt. ratio of 75:25, Procedure B
[F]Red 624

EXAMPLE 15

The procedure of Example 12 is followed substituting the CSiM modifier ((Si/BA)-S/AN wt. ratio of 70:30, S/AN wt. ratio of 75:25) prepared by the method of Procedure C for the CSiM modifier prepared by the method of Procedure B. A composition will be formed in accordance with the appended claims.

EXAMPLE 16

The procedure of Example 12 is followed substituting the CSiM modifier ((Si/PS)-BA-S/AN wt. ratio of 35:35:30, S/AN wt. ratio of 75:25) prepared by the method of Procedure D for the CSiM modifier prepared by the method of Procedure B. A composition will be formed in accordance with the appended claims.

EXAMPLES 17-19

Example 12 is repeated three times adding respectively an effective amount of red phosphorous flame retardant, an effective amount of glass fiber and an effective amount of both red phosphorous and glass fiber. Compositions will be formed in accordance with the appended claims.

EXAMPLE 20

The procedure of Example 12 is followed substituting the CSiM modifier ((Si/PS)-PS wt. ratio of 70:30) prepared by the method of Procedure E for the CSiM modifier prepared by the method of Procedure B. A composition will be formed in accordance with the appended claims.

EXAMPLE 21

The procedure of Example 12 is followed substituting the CSiM modifier (Si/PS-MMA wt. ratio of 70:30) prepared by the method of Procedure F for the CSiM prepared by the method of Procedure B. A composition will be formed in accordance with the appended claims.

EXAMPLE 22

The procedure of Example 11 is followed, except dry blending is performed with no polyester resin. A composition will be formed in accordance with the appended claims.

In the foregoing examples, the degree of swelling can be determined in the following fashion:

A prepared polyorganosiloxane-based latex is coagulated by adding it to about four times its volume of methanol and water (1:1 volume ratio) containing 1 wt. percent $MgSO_4$. The precipitated rubber is washed and vacuum-dried at 70° C. overnight. Approximately 1 g of the dry silicone-based rubber is immersed in 100 ml of toluene for 20 to 24 hours at ambient temperature and allowed to swell. The excess toluene is separated by decantation. The swelled polymer is vacuum-dried at 60° C. overnight, and the resulting polymer is weighed. The degree of swelling is calculated as: DS=((weight of swelled polymer)−(weight of dry polymer)) divided by (weight of dry polymer).

Graft Efficiency can be determined by weighing dry multi-stage polyorganosiloxane-based graft polymer in a weighed thimble which is Soxhlet extracted by acetone for 20 to 22 hours. After vacuum-drying, the residue of the extraction is weighed. The graft efficiency is calculated as: GF (%)=((weight of grafted monomer(s)×100) divided by (weight of total monomer(s) polymerized).

All patents, applications, publications and test methods mentioned above are hereby incorporated by reference.

Many variations of the present invention will suggest themselves to those skilled in this art in light of the above, detailed description. For example, the aromatic polycarbonate can be replaced in whole or in part with a polyester carbonate containing units derived from bisphenol-A, phosgene and terephthaloyl chloride and/or isophthaloyl chloride. The aromatic polycarbonate can be replaced in whole or in part by a polycarbonate containing units of bis(3,5-dimethyl-4-hydroxy phenyl)-sulfone, alone or combined with bisphenol-A. The poly(ethylene terephthalate) can be replaced in whole or in part by poly(1,4-butylene terephthalate) or by a polyester derived from 1,4-cyclohexanedimethanol alone or combined with ethylene glycol and terephthalic acid and/or isophthalic acid. Platinum complexes may be employed as catalysts in the hydrosilation process.

Additionally, modifiers (B) comprising four or more component combinations can be designed such as two different CSiM's, a GSiM and a diene rubber-based graft copolymer; two different CSiM's and two different diene rubber-based graft copolymers; two different CSiM's and two different GSiM's; three different CSiM's and a GSiM; three different GSiM's and a CSiM; two different diene rubber-based graft copolymers, a GSiM and a CSiM; and the like. All such modifications are within the full intended scope of the appended claims.

We claim:

1. A polyphasic resin composition comprising a mixture (A-1) comprising (i) a polycarbonate resin phase and (ii) a saturated polyester resin phase; a mixture (A-2) comprising (i) a polycarbonate resin phase, (ii) a saturated polyester resin phase, and one or more of (iii) a poly(etherester) elastomer phase, (iv) a poly(etherimide ester) elastomer phase, or (v) a polyphenylene ether resin phase; or a mixture (A-3) of (A-1) and (A-2); and an effective amount of a modifier composition (B) comprising, in combination;
(1) a multi-stage graft polymer composition comprising
   (a) as a first stage,
      (i) an organosiloxane polymer, units derived from a cross-linking agent or agents and optionally units which serve as a graft-linking agent or agents;

(ii) a polymeric substrate comprised of units of a diene rubber and optionally units derived from a cross-linking agent or agents; or (iii) a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and (b) at least one subsequent stage or stages graft polymerized in the presence of any previous stages and which is comprised of a vinyl-based polymer or a cross-linked vinyl-based polymer, the outermost stage of which contains from zero to no more than an amount of polymerized or copolymerized (meth)acrylonitrile units which will induce migration of multi-stage composition (1) into said polycarboante resin phase; and (2) a multi-stage graft polymer composition, comprising (a) as a first stage,
(i) an organosiloxane polymer, units derived from a cross-linking agent or agents and optionally units which serve as a graft-linking agent or agents;

(ii) a polymeric substrate comprised of units of a diene rubber and optionally units derived from a cross-linking agent or agents; or (iii) a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and (b) at least one subsequent stage or stages graft polymerized in the presence of any previous stages and which is comprised of a vinyl-based polymer or a cross-linked vinyl-based polymer, the outermost stage having a content of polymerized or copolymerized (meth)acrylonitrile units at least sufficient to induce migration of multi-stage composition (2) into said saturated polyester resin phase.

2. A composition as defined in claim 1 wherein said content of polymerized or copolymerized (meth)acrylonitrile units in the outermost stage of multi-stage composition (1) ranges from 0 to less than about 20 percent by weight of said outermost stage and said content of polymerized or copolymerized (meth)acrylonitrile units in the outermost stage of multi-stage composition (2) ranges upwardly from greater than about 20 percent by weight of said outermost stage.

3. A composition as defined in claim 2 wherein said content of polymerized or copolymerized (meth)acrylonitrile units in the outermost stage of multi-stage composition (1) ranges from 0 to about 5 percent by weight of said outermost stage and said content of polymerized or copolymerized (meth)acrylonitrile units in the outermost stage of multi-stage composition (2) ranges upwardly from greater than about 25 percent by weight of said outermost stage.

4. A composition as defined in claim 1 which also includes a multi-stage graft polymer composition (3) which is different than both (1) and (2) and comprises (a) as a first stage,
(i) an organosiloxane polymer, units derived from a cross-linking agent or agents and optionally units which serve as a graft-linking agent or agents;

(ii) a polymeric substrate comprised of units of a diene rubber and optionally units derived from a cross-linking agent or agents; or (iii) a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and (b) at least one subsequent stage or stages graft polymerized in the presence of any previous stages and which is comprised of a vinyl-based polymer or a cross-linked vinyl-based polymer.

5. A composition as defined in claim 1 wherein component A-1, A-2 or A-3 comprises from 1 to 99 parts by weight and component B comprises from 99 to 1 part by weight per 100 parts by weight of A-1, A-2 or A-3 and B combined.

6. A composition as defined in claim 1 wherein said first stage substrates (1)(a) and (2)(a) each independently comprise approximately 5 to 95 weight percent of the total corresponding graft polymer composition (1) and (2) based upon the weight of said first stage and any subsequent graft stages taken together.

7. A composition as defined in claim 1 wherein said first stages (1)(a) and (2)(a) each independently comprise approximately 30 to 90 weight percent of the total weight of each corresponding graft polymer composition (1) and (2).

8. A composition as defined in claim 1 wherein in said polymers (1) and (2), at least one of said first stage substrates (1)(a)(iii) and (2)(a)(iii) independently are comprised of approximately 3 to 97 weight percent organosiloxane-based polymer and correspondingly about 97 to 3 weight percent vinyl-based polymer.

9. A composition as defined in claim 8 wherein at least one of said first stage substrates (1)(a)(iii) and (2)(a)(iii) independently are comprised of approximately 5 to 45 weight percent vinyl-based polymer.

10. A composition as defined in claim 1 wherein said organosiloxane polymers (1)(a)(i), (1)(a)(iii), (2)(a)(i) and (2)(a)(iii) independently are comprised primarily of units of the formula $$R_nSiO_{(4-n)/2}$$

wherein R is hydrogen or a monovalent hydrocarbon radical of about 1 to 16 carbon atoms and n is 0, 1 or 2.

11. A composition as defined in claim 1 wherein in said co-homopolymers (1)(a)(iii) and (2)(a)(iii), the vinyl-based polymer component of said first stage substrates (1)(a)(iii) and (2)(a)(iii) are independently comprised primarily of alkenyl aromatic units, (meth)acrylate units or a mixture thereof.

12. A composition as defined in claim 1 wherein at least one of said vinyl-based polymer components comprises polystyrene.

13. A composition as defined in claim 1 wherein said vinyl-based polymer in the subsequent stage or stages (1)(b) and (2)(b) independently comprise at least one selected from the group consisting of alkenyl aromatic compounds, (meth)acrylate compounds, vinyl cyanide compounds, maleimide compounds, and acrylamide compounds.

14. A composition as defined in claim 13 wherein said vinyl-based polymers in the subsequent stage or stages (1)(b) and (2)(b) are independently selected from the group consisting of polystyrene, styrene/acrylonitrile copolymer, poly(methyl methacrylate), methyl methacrylate/acrylonitrile copolymer and styrene/methyl methacrylate copolymer.

15. A composition as defined in claim 1 wherein subsequent stages (1)(b) comprise
   (b)(i) a second stage comprising at least one vinyl polymer and optionally units derived from a cross-linking agent or agents, units which serve as a graft-inking agent or agents, units derived from a cross-linking agent or agents and units from the same or different agent or agents which serve as a graft-linking agent or agents, or a mixture of any of the foregoing; and
   (b)(ii) a third stage comprising at least one vinyl-based polymer or cross-linked vinyl-based polymer which is the same or different than (b)(i), and which contains from zero to no more than an amount of polymerized or copolymerized (meth)acrylonitrile which will induce migration of multi-stage composition (1) into said polycarbonate resin phase; or
subsequent stages (2)(b) comprise
   (b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
   (b)(ii) a third stage comprising at least one vinyl-based polymer or cross-linked vinyl-based polymer which is the same or different than (b)(i), and which has a content of polymerized or copolymerized (meth)acrylonitrile units at least sufficient to induce migration of multi-stage composition (2) into said saturated polyester resin phase; or
subsequent stages (1)(b) comprise said (1)(b)(i) and said (1)(b)(ii) stages and subsequent stages (2)(b) comprise said (2)(b)(i) and said (2)(b)(ii) stages.

16. A composition as defined in claim 15 wherein the ratio of first stage substrates (1)(a) and (2)(a), to corresponding second stage polymer (1)(b)(i) and (2)(b)(i) independently are 10:90 to 90:10 and the amount of corresponding third stage polymers (1)(b)(ii) and (2)(b)(ii), independently comprise from about 10 to about 90 parts by weight per 100 parts by weight of corresponding (1)(a), (1)(b)(i) and (1)(b)(ii) combined or (2)(a), (2)(b)(i) and (2)(b)(ii) combined.

17. A composition as defined in claim 1 wherein said polycarbonate resin (i) comprises poly(bisphenol-A carbonate).

18. A composition as defined in claim 1 wherein said saturated polyester resin (ii) comprises the reaction product of a dicarboxylic acid or derivative thereof and a diol.

19. A composition as defined in claim 18 wherein said saturated polyester resin (ii) comprises poly(1,4-butylene terephthalate).

20. A composition as defined in claim 1 wherein said poly(etherester) elastomer (iii) comprises a block copolymer consisting of (1) polyester segments and (2) polyether segments.

21. A composition as defined in claim 1 wherein said poly(etherimide ester) elastomer (iv) comprises a block copolymer consisting of (1) polyester segments and (2) poly(etherimide) segments.

22. A composition as defined in claim 20 wherein said polyester segments comprise poly(1,4-butylene terephthalate) and said polyether segments comprise a polyalkylene ether glycol.

23. A composition as defined in claim 21 wherein said polyester segments comprise poly(1,4-butylene terephthalate) and said poly(etherimide) segments comprise an imide acid capped polyalkylene ether diamine.

24. A composition as defined in claim 1 wherein said poly(etherimide ester) elastomer (iv) is the reaction product of (a) one or more low molecular weight diols, (b) one or more dicarboxylic acids, and (c) one or more polyoxyalkylene diimide diacids.

25. A composition as defined in claim 24 wherein said polyoxyalkylene diimide diacid is derived from trimellitic anhydride and a polyoxyalkylene diamine selected from the group consisting of polypropylene oxide diamine and a copoly(ethylene oxide/propylene oxide) diamine having predominantly polyethylene oxide in the backbone.

26. A composition as defined in claim 1 wherein said polyphenylene ether resin (iv) comprises poly(2,6-dimethyl-1,4-phenylene)ether, a copolymer of (2,6-dimethyl-1,4-phenylene)ether with (2,3,6-trimethyl-1,4-phenylene)ether or a mixture thereof.

27. A composition as defined in claim 1 which also includes
   (C) an effective amount of a flame retardant agent.

28. A composition as defined in claim 15 which also includes
   (C) an effective amount of a flame retardant agent.

29. A composition as defined in claim 1 which also includes
   (D) an effective amount of a reinforcing filler.

30. A composition as defined in claim 15 which also includes
   (D) an effective amount of a reinforcing filler.

31. A composition as defined in claim 1 which also includes
   (C) an effective amount of flame retardant agent; and
   (D) an effective amount of a reinforcing filler.

32. A composition as defined in claim 15 which also includes
   (C) an effective amount of flame retardant agent; and
   (D) an effective amount of a reinforcing filler.

33. An article molded from a composition as defined in claim 1.

34. An article molded from a composition as defined in claim 15.

35. An article extruded from a composition as defined in claim 1.

36. An article extruded from a composition as defined in claim 15.

37. An article thermoformed from a composition as defined in claim 1.

38. An article thermoformed from a composition as defined in claim 15.

39. A polyphasic resin composition comprising a mixture (A-1) comprising (i) a polycarbonate resin phase and (ii) a saturated polyester resin phase; and
an effective amount of a modifier composition (B) comprising, in combination,
(1) a multi-stage polyorganosiloxane/polyvinyl-based graft polymer composition comprising
  (a) as a first stage, a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and
  (b) at least one subsequent stage or stages graft polymerized in the presence of any previous stages and which is comprised of a vinyl-based polymer or a cross-linked vinyl-based polymer, the outermost stage of which contains from zero to no more than an amount of polymerized or copolymerized (meth)acrylonitrile units, which will induce migration of multi-stage composition (1) into said polycarbonate resin phase; and
(2) a multi-stage polyorganosiloxane/polyvinyl-based graft polymer composition comprising:
  (a) as a first stage, a polymeric co-homopolymerized substrate, which may be the same as or different than (1)(a), comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and
  (b) at least one subsequent stage or stages graft polymerized in the presence of any previous stages and which is comprised of a vinyl-based polymer or a cross-linked vinyl-based polymer, the outermost stage having a content of polymerized or copolymerized (meth)acrylonitrile units at least sufficient to induce migration of multi-stage composition (2) into said saturated polyester resin phase.

40. A composition as defined in claim 39 wherein said content of polymerized or copolymerized (meth)acrylonitrile units in the outermost stage of multi-stage composition (1) ranges from 0 to less than about 20 percent by weight of said outermost stage and said content of polymerized or copolymerized (meth)acrylonitrile units in the outermost stage of multi-stage composition (2) ranges upwardly from greater than about 20 percent by weight of said outermost stage.

41. A composition as defined in claim 39 wherein said content of polymerized or copolymerized (meth)acrylonitrile units in the outermost stage of multi-stage composition (1) ranges from 0 to about 5 percent by weight of said outermost stage and said content of polymerized or copolymerized (meth)acrylonitrile units in the outermost stage of multi-stage composition (2) ranges upwardly from greater than about 25 percent by weight of said outermost stage.

42. A composition as defined in claim 39 wherein component (A-1) comprises from about 1 to about 99 parts by weight and component (B) comprises from about 99 to about 1 part by weight per 100 parts by weight of (A-1) and (B) together.

43. A composition as defined in claim 39 wherein component (A-1) comprises from about 99 to about 37 parts by weight and component (B) comprises from about 1 to about 63 parts by weight per 100 parts by weight of (A-1) and (B) together.

44. A composition as defined in claim 39 wherein component (1) comprises from about 1 to about 99 parts by weight and component (2) comprises from about 99 to about 1 part by weight per 100 parts by weight of (B).

45. A composition as defined in claim 44 wherein component (1) comprises from about 75 to about 99 parts by weight and component (2) comprises from about 1 to about 25 parts by weight per 100 parts by weight of (B).

46. A composition as defined in claim 39 wherein said organosiloxane/vinyl co-homopolymer first stage substrate (1)(a) comprises approximately 5 to 95 weight percent of the total graft polymer composition (1) based upon the weight of said first stage and any subsequent graft stages (1)(b) taken together.

47. A composition as defined in claim 39 wherein said organosiloxane/vinyl co-homopolymer first stage substrate (2)(a) comprises approximately 5 to 95 weight percent of the total graft polymer composition (2) based upon the weight of said first stage and any subsequent graft stages (2)(b) taken together.

48. A composition as defined in claim 46 wherein said first stage substrate (1)(a) comprises approximately 30 to 90 weight percent of the total graft polymer composition (1).

49. A composition as defined in claim 47 wherein said first stage substrate (2)(a) comprises approximately 30 to 90 weight percent of the total graft polymer composition (2).

50. A composition as defined in claim 39 wherein said first stage substrates (1)(a) and (2)(a) are independently comprised of approximately 3 to 97 weight percent organosiloxane-based polymer and correspondingly approximately 97 to 3 weight percent vinyl-based polymer.

51. A composition as defined in claim 39 wherein said first stage substrates (1)(a) and (2)(a) are independently comprised of approximately 5 to 45 weight percent vinyl-based polymer.

52. A composition as defined in claim 39 wherein said organosiloxane polymer in first stages (1)(a) and (2)(a) are independently comprised primarily of units of the formula

wherein R is hydrogen or a monovalent hydrocarbon radical of about 1 to 16 carbon atoms and n is 0, 1 or 2.

53. A composition as defined in claim 39 wherein said vinyl-based polymer components of said first stage substrates (1)(a) and (2)(a) independently are comprised primarily of the same or different alkenyl aromatic units, (meth)acrylate units or a mixture thereof.

54. A composition as defined in claim 53 wherein at least one of said vinyl-based polymer components of said first stage substrates (1)(a) and (2)(a) comprises polystyrene.

55. A composition as defined in claim 53 wherein in addition to alkenyl aromatic units, at least one of said vinyl-based polymer components of said first stage substrates (1)(a) and (2)(a) also includes divinylbenzene units.

56. A composition as defined in claim 55 wherein at least one of said vinyl-based polymer components of said first stage substrates (1)(a) and (2)(a) comprieses styrene/divinylbenzene copolymer.

57. A composition as defined in claim 39 wherein said vinyl-based polymer or cross-linked vinyl-based polymer in any subsequent stage (1)(b) comprises at least one of selected from the group consisting of alkenyl aromatic compounds, (meth)acrylate compounds, vinyl cyanide compounds, maleimide compounds, acrylamide compounds, or any combination of the foregoing compounds.

58. A composition as defined in claim 57 wherein said vinyl-based polymer or cross-linked vinyl-based polymer in any subsequent stage (1)(b) is selected from the group consisting of polystyrene, methyl methacrylate, styrene/divinylbenzene copolymer, styrene/acrylonitrile copolymer, methyl methacrylate/acrylonitrile copolymer, styrene/methyl methacrylate copolymer and styrene/acrylonitrile/divinylbenzene terpolymer.

59. A composition as defined in claim 39 wherein said polymer in any subsequent stage (2)(b) comprises at least one selected from the group consisting of alkenyl aromatic/acrylonitrile copolymer, methyl meth(acrylate)/acrylonitrile copolymer, maleimide/acrylonitrile copolymer and acrylamide/acrylonitrile copolymer.

60. A composition as defined in claim 59 wherein said polymer in any subsequent stage (2)(b) is selected from the group consisting of styrene/acrylonitrile copolymer and methyl methacrylate/acrylonitrile copolymer.

61. A composition as defined in claim 39 wherein subsequent stages (1)(b) comprise
(b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
(b)(ii) a third stage comprising at least one vinyl-based polymer or cross-linked vinyl-based polymer which is the same or different than (b)(i) and which contains from zero to no more than an amount of polymerized or copolymerized (meth)acrylonitrile units which will induce migration of multi-stage composition (1) into said polycarbonate resin phase; or
subsequent stages (2)(b) comprise
(b)(i) a second stage comprising at least one vinyl polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
(b)(ii) a third stage comprising at least one vinyl-based polymer or a cross-linked vinyl-based polymer which is the same or different than (b)(i) and which has a content of polymerized or copolymerized (meth)acrylonitrile units at least sufficient to induce migration of multi-stage composition (2) into said saturated polyester resin phase; or
subsequent stages (1)(b) comprise said (1)(b)(i) and said (1)(b)(ii) stages and subsequent stages (2)(b) comprise said (2)(b)(i) and said (2)(b)(ii) stages.

62. A composition as defined in claim 61 wherein the ratio of first stage substrate (1)(a) to second stage polymer (1)(b)(i) is 10:90 to 90:10 and the amount of third stage polymer (1)(b)(ii) comprises from about 10 to about 90 parts by weight per 100 parts by weight of (1)(a), (1)(b)(i) and (1)(b)(ii) combined; and the ratio of first stage substrate (2)(a) to second stage polymer (2)(b)(i) is 10:90 to 90:10 and the amount of third stage polymer (2)(b)(ii) comprises from about 10 to about 90 parts by weight per 100 parts by weight of (2)(a), (2)(b)(i) and (2)(b)(ii) combined.

63. A composition as defined in claim 39 wherein said polycarbonate resin phase (A-1)(i) comprises the reaction product of (1) a dihydroxydiarylalkane, (2) a polyhydroxypolyarylalkane, or a mixture of (1) and (2), and (3) either (a) phosgene or (b) a diester of carbonic acid.

64. A composition as defined in claim 61 wherein said polycarbonate resin phase (A-1)(i) comprises the reaction product of (1) a dihydroxydiarylalkane, (2) a polyhydroxypolyarylalkane, or a mixture of (1) and (2), and (3) either (a) phosgene or (b) a diester of carbonic acid.

65. A composition as defined in claim 63 wherein said polycarbonate resin phase comprises a poly(bisphenol-A carbonate) resin phase.

66. A composition as defined in claim 64 wherein said polycarbonate resin phase comprises a poly(bisphenol-A carbonate) resin phase.

67. A composition as defined in claim 39 wherein said saturated polyester resin phase (A-1)(ii) comprises the reaction product of a dicarboxylic acid and a glycol.

68. A composition as defined in claim 61 wherein said saturated polyester resin phase (A-1)(ii) comprises the reaction product of a dicarboxylic acid and a glycol.

69. A composition as defined in claim 67 wherein said saturated polyester resin phase (A-1)(ii) comprises a poly(1,4-butylene terephthalate) resin phase.

70. A composition as defined in claim 68 wherein said saturated polyester resin phase (A-1)(ii) comprises a poly(1,4-butylene terephthalate) resin phase.

71. A composition as defined in claim 39 wherein said resin mixture (A-1) comprises (i) a poly(bisphenol-A carbonate) resin phase and (ii) a poly(1,4-butylene terephthalate) resin phase.

72. A composition as defined in claim 61 wherein said resin mixture (A-1) comprises (i) a poly(bisphenol-A carbonate) resin phase and (ii) a poly(1,4-butylene terephthalate) resin phase.

73. A composition as defined in claim 39 which also includes
(D) an effective amount of a flame retardant agent.

74. A composition as defined in claim 61 which also includes
(D) an effective amount of a flame retardant agent.

75. A composition as defined in claim 39 which also includes
(E) an effective amount of a reinforcing filler.

76. A composition as defined in claim 61 which also includes
(E) an effective amount of a reinforcing filler.

77. A composition as defined in claim 39 which also includes
(D) an effective amount of a flame retardant agent; and
(E) an effective amount of a reinforcing filler.

78. A composition as defined in claim 61 which also includes
(D) an effective amount of a flame retardant agent; and
(E) an effective amount of a reinforcing 79. An article molded from a composition as defined in claim 39.

80. An article molded from a composition as defined in claim 61.

81. An article extruded from a composition as defined in claim 39.

82. An article extruded from a composition as defined in claim 61.

83. An article thermoformed from a composition as defined in claim 39.

84. An article thermoformed from a composition as defined in claim 61.

85. A process for producing a polyphasic resin composition comprising the steps of
(i) providing two first stage substrates independently by the concurrent co-homopolymerization of
  (1) an organosiloxane and one or more vinyl-based monomers;
  (2) an organosiloxane, one or more vinyl-based monomers, and units which are derived from a cross-linking agent or agents;
  (3) an organosiloxane, one or more vinyl-based monomers, and units which serve as a graft-linking agent or agents;
  (4) an organosiloxane, one or more vinyl-based monomers, units which are derived from at least one cross-linking agent or agents and units of the same or different agent or agents which serve as a graft-linking agent or agents; or
  (5) a mixture of any of (1), (2), (3) or (4);
(ii) independently neutralizing each of the two reaction masses of the foregoing polymerization step to a pH of at least about 6.5 to provide a neutralized polyorganosiloxane/polyvinyl-based substrate latex;
(iii) graft polymerizing to one of said first stage substrates at least one vinyl-based monomer or a vinyl-based monomer and a cross-linker, said monomers being selected to provide that the outermost stage contains from zero to no more than an amount of polymerized or copolymerized (meth)acrylonitrile which will induce migration of the resultant multi-stage composition into the polycarbonate phase of a polycarbonate resin phase/saturated polyester resin phase mixture;
(iv) graft polymerizing to the remaining of said two first stage substrates a vinyl-based monomer or vinyl-based monomer and cross-linker, said monomers being selected to provide that the outermost stage has a content of polymerized or copolymerized (meth)acrylonitrile units at least sufficient to induce migration of the resultant multistage composition into the saturated polyester resin phase of a polycarbonate resin phase/saturated polyester resin phase mixture;
(v) isolating said two multi-stage organo-siloxane/vinyl-based graft polymers to provide two polyorganosiloxane/polyvinyl-based modifiers for thermoplastic resins;
(vi) combining independent modifying amounts of said two polyorganosiloxane/polyvinyl-based modifier with a polyphasic resin mixture.

86. A process as defined in claim 85 wherein in step (i), only one first stage substrate is provided and is subsequently divided into two independent portions to provide two first stage substrates.

87. A process as defined in claim 85 wherein in step (i) only one first stage substrate is provided and in step (ii) the first stage substrate of step (i) is neutralized to a pH of at least about 6.5 and is then divided into two independent portions to provide two first stage substrates.

88. A process as defined in claim 85 wherein the graft polymerization step (iii) is carried out in two successive stages comprising:
(1) graft polymerizing at least one vinyl-based monomer; or vinyl-based monomer in admixture with a cross-linker, a graft-linker or a cross- and graft-linker or a mixture of any of the foregoing to produce a second stage polymer or cross-linked polymer on said substrate, and thereafter,
(2) graft polymerizing at least one vinyl-based monomer or a vinyl-based monomer and a cross-linker which is the same as or different than that used in stage (1), to produce a third stage of polymer on said second stage, said monomers being selected to provide that the outermost stage contains from zero to no more than an amount of polymerized or copolymerized (meth)acrylonitrile which will induce migration of the resultant multi-stage composition into the polycarbonate phase of a polycarbonate resin phase/saturated polyester resin phase mixture.

89. A process as defined in claim 85 wherein the graft polymerization step (iv) is carried out in two successive stages comprising:
(1) graft polymerizing at least one vinyl-based monomer; or vinyl-based monomer in admixture with a cross-linker, a graft-linker or a cross- and graft-linker or a mixture of any of the foregoing to produce a second stage polymer or cross-linked polymer on said substrate, and thereafter,
(2) graft polymerizing at least one vinyl-based monomer or a vinyl-based monomer and a cross-linker which is the same as or different than that used in stage (1), to produce a third stage of polymer on said second stage, said monomers being selected to provide that the outermost stage has a content of polymerized or copolymerized (meth)acrylonitrile units at least sufficient to induce migration of the resultant multi-stage composition into the saturated polyester resin phase of a polycarbonate resin phase/saturated polyester resin phase mixture.

90. A process as defined in claim 85 wherein the graft polymerization step (iii) is carried out in the successive stages comprising:
(1) graft polymerizing at least one vinyl-based monomer; or vinyl-based monomer in admixture with a cross-linker, a graft-linker or a cross and graft-linker or a mixture of any of the foregoing to produce a second stage polymer or cross-linked polymer on said substrate, and thereafter;
(2) graft polymerizing at least one vinyl-based monomer or a vinyl-based monomer and a cross-linker which is the same as or different than that used in stage (1), to produce a third stage polymer on said second stage, said monomers being selected to provide that the outermost stage contains from zero to no more than an amount of polymerized or copolymerized (meth)-acrylonitrile which will induce migration of the resultant multi-stage composition into the polycarbonate phase of a polycarbonate resin phase/saturated polyester resin phase mixture; and the graft polymerization step (iv) is carried out in the successive stages comprising:

(1) graft polymerizing at least one vinyl-based monomer; or vinyl-based monomer in admixture with a cross-linker, a graft-linker or a cross- and graft-linker or a mixture of any of the foregoing to produce a second stage polymer or cross-linked polymer on said substrate, and thereafter;

(2) graft polymerizing at least one vinyl-based monomer; or a vinyl-based monomer and a cross-linker which is the same as or different than that used in stage (1), to produce a third stage of polymer on said second stage, said monomers being selected to provide that the outermost stage has a content of polymerized or copolymerized (meth)acrylonitrile units at least sufficient to induce migration of the resultant multi-stage composition into the saturated polyester resin phase of a polycarbonate resin/saturated polyester resin mixture.

91. A process as defined in claim 85 wherein step (iv) is performed before step (iii).

92. A process as defined in claim 85 wherein said polyphasic resin comprises a mixture of a polycarbonate resin phase and a saturated polyester resin phase.

93. A process as defined in claim 88 wherein said polyphasic resin comprises a mixture of a polycarbonate resin phase and a saturated polyester resin phase.

94. A process as defined in claim 89 wherein said polyphasic resin comprises a mixture of a polycarbonate resin phase and a saturated polyester resin phase.

95. A process as defined in claim 90 wherein said polyphasic resin comprises a mixture of a polycarbonate resin phase and a saturated polyester resin phase.

96. A composition comprising a polycarbonate resin (A); a mixture (A-1) comprising (i) a polycarbonate resin and (ii) a saturated polyester resin; a mixture (A-2) comprising (i) a polycarbonate resin and (iii) a poly(etherester) elastomer, or (iv) a poly(etherimide ester) elastomer or a mixture of (iii) and (iv); a mixture (A-3) comprising (i) a polycarbonate resin, (ii) a saturated polyester resin and (iii) a poly(etherester) elastomer, or (iv) a poly(etherimide ester) elastomer or a mixture of (iii) and (iv); or a mixture (A-4) of any of the foregoing; and an effective amount of a modifier composition (B) comprising, in combination, (1) a multi-stage polyorganosiloxane-based graft polymer composition comprising (a)(i) as a first stage, an organosiloxane polymer, units derived from a cross-linking agent or agents and optionally units which serve as a graft-linking agent or agents; and (b) at least one subsequent stage or stages graft polymerized in the presence of any previous stages and which is comprised of a vinyl-based polymer or a cross-linked vinyl-based polymer; and (2) a diene rubber-based graft copolymer composition comprising (a)(ii) as a first stage, a polymeric substrate comprised of units of a diene rubber and optionally units derived from a cross-linking agent or agents; and (b) at least one subsequent stage graft polymerized in the presence of any previous stages and which is comprised of a vinyl-based polymer or a cross-linked vinyl-based polymer, the weight ratio of (1) to (2) being from 1 to 9:9 to 1; or (1) a multi-stage polyorganosiloxane/polyvinyl-based graft polymer composition comprising, (a)(iii) as a first stage, a polymeric co-homopolymerized substrate comprised of, in combination, an organosiloxane polymer; at least one vinyl-based polymer; and optionally units derived from a cross-linking agent or agents, units which serve as a graft-linking agent or agents, units derived from a cross-linking agent or agents and units from the same or different agent or agents which serve as a graft-linking agent or agents or a mixture of any of the foregoing; and (b) at least one subsequent stage or stages graft polymerized in the presence of any previous stages and which is comprised of a vinyl-based polymer or a cross-linked vinyl-based polymer; and (2) a diene rubber-based graft copolymer composition comprising (a)(ii) as a first stage, a polymeric substrate comprised of units of a diene rubber and optionally units derived from a cross-linking agent or agents; and (b) at least one subsequent stage graft polymerized in the presence of any previous stages and which is comprised of a vinyl-based polymer or a cross-linked vinyl-based polymer, the weight ratio of (1) to (2) being from 1 to 9:9 to 1.

97. A composition as defined in claim 96 wherein mixture (A-1) comprises (i) a polycarbonate resin and (ii) a saturated polyester resin.

98. A composition as defined in claim 96 wherein component (A), (A-1), (A-2), (A-3) or (A-4) comprises from 1 to 99 parts by weight and component (B) comprises from 99 to 1 part by weight per 100 parts by weight of (A), (A-1), (A-2), (A-3) or (A-4) and (B) combined.

99. A composition as defined in claim 96 wherein said first stages (a) in (1) and (2) comprise approximately 5 to 95 weight percent of the total graft polymer composition based upon the weight of said first stage and any subsequent graft stages taken together.

100. A composition as defined in claim 99 wherein said first stages (a) comprise approximately 30 to 90 weight percent of the total weight of each graft polymer composition.

101. A composition as defined in claim 96 wherein in said composition (1) said first stage substrate (a)(iii) is comprised of approximately 3 to 97 weight percent organosiloxane-based polymer and correspondingly about 97 to 3 weight percent vinyl-based polymer.

102. A composition as defined in claim 101 wherein said first stage substrate, (1)(a), is comprised of approximately 5 to 45 weight percent vinyl-based polymer.

103. A composition as defined in claim 96 wherein said organosiloxane polymer is comprised primarily of units of the formula

wherein R is hydrogen or a monovalent hydrocarbon radical of about 1 to 16 carbon atoms and n is 0, 1 or 2.

104. A composition as defined in claim 96 wherein the vinyl-based polymer component of said first stage substrate (1)(a)(iii) is comprised primarily of alkenyl aromatic units, (meth)acrylate units or a mixture thereof.

105. A composition as defined in claim 104 wherein said vinyl-based polymer component of said first stage substrate (1)(a)(iii) comprises polystyrene.

106. A composition as defined in claim 96 wherein said vinyl-based polymer in the subsequent stage or stages (1)(b) and (2)(b) comprise at least one selected from the group consisting of alkenyl aromatic compounds, (meth)acrylate compounds, vinyl cyanide compounds, maleimide compounds, and acrylamide compounds.

107. A composition as defined in claim 106 wherein said vinyl-based polymer in the subsequent stage or stages (1)(b) and (2)(b) is selected from the group consisting of polystyrene, styrene/acrylonitrile copolymer, poly(methyl methacrylate) and styrene/methyl methacrylate copolymer.

108. A composition as defined in claim 96 wherein said first stage substrate (2)(a) comprises units of a polybutadiene rubber.

109. A composition as defined in claim 108 wherein said subsequent stage or stages (2)(b) comprise poly(methyl methacrylate), a methyl methacrylate/styrene copolymer or a styrene/acrylonitrile copolymer.

110. A composition as defined in claim 96 wherein said subsequent stages in components (1) and (2)

(b)(i) a second stage comprising at least one vinyl polymer and optionally units derived from a cross-linking agent or agents, units which serve as a graft-linking agent or agents, units derived from a cross-linking agent or agents and units from the same agent or agents which serve as a graft-linking agent or agents, or a mixture of any of the foregoing; and (b)(ii) a third stage comprising at least one vinyl-based polymer or cross-linked vinyl-based polymer which is the same or different than (b)(i).

111. A composition as defined in claim 110 wherein the ratio of first substrate (1)(a) and (2)(a) to second stage polymer (b)(i) is 10:90 to 90:10 and the amount of third stage polymer (b)(ii) comprises from about 10 to about 90 parts by weight per 100 parts by weight of (1)(a), (2)(a), (b)(i), and (b)(ii) combined.

112. A composition as defined in claim 110 wherein in (1) subsequent stage (b)(i) comprises a cross-linked butyl acrylate polymer and subsequent stage (b)(ii) comprises a styrene/acrylonitrile copolymer.

113. A composition as defined in claim 96 wherein said polycarbonate resin (A) comprises poly(bisphenol-A carbonate).

114. A composition as defined in claim 96 wherein said saturated polyester resin (ii) comprises the reaction product of a dicarboxylic acid or derivative thereof and a diol.

115. A composition as defined in claim 114 wherein said saturated polyester resin (ii) comprises poly(1,4-butylene terephthalate).

116. A composition as defined in claim 96 wherein said poly(etherester) elastomer (iii), poly(etherimide ester) elastomer (iv) or mixture of (iii) and (iv), comprises a block copolymer consisting of (1) polyester segments and (2) polyether or poly(etherimide) segments.

117. A composition as defined in claim 116 wherein said polyester segments comprise poly(1,4-butylene terephthalate) and said polyether or poly(etherimide) segments comprise a polyalkylene ether glycol or an imide acid capped polyalkylene ether diamine, or a mixture of such segments.

118. A composition as defined in claim 96 which also includes (C) an effective amount of a flame retardant agent.

119. A composition as defined in claim 96 which also includes (D) an effective amount of a reinforcing filler.

120. A composition as defined in claim 96 which also includes (C) an effective amount of flame retardant agent; and (D) an effective amount of a reinforcing filler.

121. An article molded from a composition as defined in claim 96.

122. An article extruded from a composition as defined in claim 96.

123. An article thermoformed from a composition as defined in claim 96.

124. A composition as defined in claim 110 which also includes (C) an effective amount of a flame retardant agent.

125. A composition as defined in claim 110 which also includes (D) an effective amount of a reinforcing filler.

126. A composition as defined in claim 110 which also includes (C) an effective amount of a flame retardant agent; and (D) an effective amount of a reinforcing filler.

127. An article molded from a composition as defined in claim 110.

128. An article extruded from a composition as defined in claim 110.

129. An article thermoformed from a composition as defined in claim 110.

* * * * *